(12) United States Patent
Cunningham et al.

(10) Patent No.: US 6,828,040 B2
(45) Date of Patent: Dec. 7, 2004

(54) MULTI-LAYERS COATING FOR PROTECTING METALLIC SUBSTRATES

(75) Inventors: Nicolas Cunningham, Saint-Hubert (CA); Allan S. Hay, Montreal (CA); Jean-Pol Dodelet, Sainte-Julie (CA); Yeuzhong Meng, Guangzhou (CN)

(73) Assignees: Institut National de la Recherche Scientifique, Sainte-Foy (CA); Universite McGill, Montreal (CA)

( * ) Notice: Subject to any disclaimer, the term of this patent is extended or adjusted under 35 U.S.C. 154(b) by 0 days.

(21) Appl. No.: 10/150,010

(22) Filed: May 20, 2002

(65) Prior Publication Data

US 2003/0099847 A1 May 29, 2003

Related U.S. Application Data

(60) Provisional application No. 60/291,607, filed on May 18, 2001.

(51) Int. Cl.[7] .......................... B32B 15/04; B32B 15/18; B32B 9/04
(52) U.S. Cl. ....................... 428/634; 428/681; 428/684; 428/685; 428/334; 428/220
(58) Field of Search ................................. 428/408, 634, 428/681, 684, 685, 334, 220; 429/210, 40, 41

(56) References Cited

U.S. PATENT DOCUMENTS

| | | | |
|---|---|---|---|
| 3,300,456 A | | 1/1967 | Hay ........................... 260/88.2 |
| 3,821,153 A | | 6/1974 | White ................... 260/33.6 UA |
| 3,852,235 A | | 12/1974 | Krutchen .................... 260/32.4 |
| 3,899,574 A | | 8/1975 | Silva et al. ................... 423/447 |
| 3,928,516 A | | 12/1975 | Silva et al. ..................... 264/29 |
| 3,933,722 A | | 1/1976 | Krutchen .................... 260/32.4 |
| 4,842,945 A | * | 6/1989 | Ito et al. ...................... 428/457 |
| 5,455,081 A | * | 10/1995 | Okada et al. ................ 427/528 |
| 5,669,144 A | * | 9/1997 | Hahn et al. .............. 30/346.54 |
| 5,688,557 A | * | 11/1997 | Lemelson et al. ...... 427/249.14 |
| 5,759,623 A | * | 6/1998 | De Mello Borges et al. ........................ 427/249.8 |
| 5,827,613 A | * | 10/1998 | Nakayama et al. .......... 428/408 |
| 6,291,094 B1 | * | 9/2001 | Yoshimura et al. ............ 429/34 |
| 6,548,173 B2 | * | 4/2003 | Erdemir et al. .............. 428/408 |
| 2002/0136895 A1 | * | 9/2002 | Kohara et al. ............... 428/408 |
| 2002/0192527 A1 | * | 12/2002 | Seido et al. ................... 429/34 |

OTHER PUBLICATIONS

Barbir, F. et al. *J. New Mat. Electrochem Systems* 1999, 197, 2, no month.
Borup, R. L. et al. *Mater. Res. Symp. Proc.* 1995, 393, no month.
Gottesfeld, S. et al. *Adv. Electrochem. Sci. and Eng* 1997, 260, 5, no month.
Woodman, A. S. et al. "Sensitivity of Nation to Metal Contaminants for Proton Conducting Membrane Fuel Cells", The Electrochemistry Society Meeting Abstract, Oct. 17–22, 1999, 1 99–2.

(List continued on next page.)

*Primary Examiner*—Michael LaVille
(74) *Attorney, Agent, or Firm*—Oblon, Spivak, McClelland, Maier & Neustadt, P.C.

(57) ABSTRACT

The invention relates to an improved composite used as a bipolar separator plate in fuel cells. The composite of the invention comprises a steel substrate having a carbon coating thereon, the carbon coating comprises a carbon layer derived by pyrolysis of an acetylenic polymer having a content of carbon of at least 90%, the carbon layer protects the substrate against corrosion and improves long term contact resistivity, the polymer is soluble at a temperature below 110° C. in an organic solvent, and the carbon layer contacts said steel substrate. A process for preparing the composite according to the invention is also disclosed.

38 Claims, 17 Drawing Sheets

OTHER PUBLICATIONS

Woodman, A. S. et al. In "Development of Corrosion–Resistant Coatings for Fuel Cell Bipolar Plates, Proc. AESF SUR/FIN Annu. Int. Tech. Conf. 1999", 717, no month.
MA, L. et al. *J. New Mat. Electrochem. Systems* 2000, 221, 3, no month.
Davies, D. P. et al. *J. Power Sources* 2000, 237, 66, no month.
Davies, D. P. et al. *J. Appl. Electrochem* 2000, 101, 30, no month.
Makkus, R. C. et al. *J.Power Sources* 2000, 274, 86, no month.
Hornung, R. et al. *J. Power Sources* 1998, 20, 72, no month.
Hay, A. S. *J. Org. Chem.* 1960, 1275, 25, no month.
Krutchen, C. M. et al. "Large Diameter High Strength, High Modulus Carbon Fibers from Polyacetylenes" in 11th Biennial Conference on Carbon, Jun. 4–8, 1973, Gatlinburg, Tenn.
Newkirk, A. E. *J. Pol. Sci. A.*, 1964, 2217, 2, no month.
Neenan, T. X. *Macromolecules*, 1988, 3525, 21, no month.
Neenan, T. X. *J. Org. Chem.* 1988, 2489, 53, no month.
Neenan, T. X. *Br. Polym. J.* 1990, 171, 23, no month.
Hay, A. S. *J. Pol. Sci. B.* 1970, 97, 8, no month.
Hay, A. S. *J. Pol. Sci. A–1*, 1970, 1022, 8, no month.
White, D.M. *Macromolecular Synthesis*, 1973, 11, 7, no month.
Murphy O. J. "Electrochemistry in Transistion from the $20^{th}$ to the $21^{st}$ Century", Plenum Press, 1992, 526, no month.
Bard, A. J. Electrochemical methods. John Wiley & Sons, 1980, 229, no month.
Wang, H, *J. Phys. Chem. B* 1999, 2042, 103, no month.
Donnet, J. B. "Carbon Black" (Science and Technology) $2^{nd}$ edition, Marcel Dekker, 1993, 91–94, no month.
Jenkins, G.M "Polymeric carbons–carbon fibre, glass and char", Cambridge University Press, 1976, 63, no month.

* cited by examiner

MULTI-LAYERS COATING FOR PROTECTING METALLIC SUBSTRATES

FIELD OF THE INVENTION

The present invention relates to improvements in the field of fuel cells. More particularly, the invention relates to an improved composite used as a bipolar separator plate (BSP) and a process for preparing said composite.

BACKGROUND OF THE INVENTION

As environmental concerns rise amongst the population, new less polluting energy sources are developed. Proton exchange membrane fuel cells offer an easy way to produce electricity from hydrogen and oxygen with water and heat as by-products. So far, fuel cells have been proposed as an alternative to combustion motors in vehicles as well as for many other applications. A proton exchange membrane (PEM) fuel cell (see FIG. 1) comprises a thin polymer film as electrolyte replacing the liquid electrolyte found in alkaline fuel cells, a cathode on one face of the membrane electrolyte and an anode on the other face of the membrane-electrolyte. In order to increase the fuel cells voltage, these cells are assembled in series. In such a case, a new component, the bipolar separator plate (BSP), is therefore required to separate each cell (see FIG. 1).

A BSP has two working faces, one confronting the anode of one cell and the other confronting the cathode on the next adjacent cell in the stack, and electrically conducts current between the adjacent cells. It is imperative that the BSP be as conductive as possible to minimise resistive losses throughout the stack (F. Barbir, J. Baun, J. Neutzler, *J. New Mat. Electrochem Systems* 2, 1999, 197; R. L. Borup, N. E. Vanderborgh, *Mater. Res. Symp. Proc.* 1995, 393). Since the BSP also separates the anodic and cathodic compartments, the BSP material should not allow hydrogen or oxygen to permeate it. In a typical stack, the BSP also contains the flow channels for distributing gases on the entire surface of the cell. On top of those properties, BSP materials should be able to survive being assembled to form the fuel cell stack and transported on site. Once in its final form, the BSP should have some basic mechanical strength and be to some degree shock resistant. Furthermore, if the flow channel design is complicated, the material used for making BSP should be easy to machine or be simply processed in its final form, by compression moulding for example.

BSP materials must also be resistant and even practically inert to constant contact with highly acidic environment such as conditions found in PEM fuel cells. The acidity of the membrane (Nafion®) is roughly equivalent to a solution containing 0.1 M of $H^+$ (S. Gottesfeld, T. A. Zawodzinski, *Adv. Electrochem. Sci. and Eng*, 5, 1997, 195. ). The pH of water coming out of the anodic and cathodic compartments ranges between 3 and 5. In such acidic conditions, most metals will either form passivating non-conductive oxides or be dissolved like steel. Passivating oxides will decrease the electrical conductivity of the BSP to intolerable levels. On the other hand, ions leached during the dissolution of ferrous materials will contaminate Nafion® that ultimately leads to poor performance (A. S. Woodman, E. B. Anderson, M. C. Kimble, "Sensitivity of Nafion® to Metal Contaminants for Proton Conducting Membrane Fuel Cells", The Electrochemistry Society Meeting Abstract, 99-2, 1999). Finally, the material used should also be a good thermal conductor to help redistribution of heat generated inside the stack.

Large scale commercialisation of fuel cells is possible if their production costs are lowered. One of the most expensive components in the proton exchange membrane fuel cell hardware is the BSP. Up to now, the material that has been widely used in making bipolar plates is graphite. Precision machining of these plates is expensive and to ensure that they are impermeable to gases and strong enough, the graphite bipolar plates are rather thick. To replace graphite, the new material must be low cost, easy to shape, light, compact and corrosion resistant. Furthermore, its electrical and thermal conductivity must be high. New processes as well as new materials must therefore be developed to fulfil all these requirements.

Recent Areas of Research on Low Cost BSP Materials and Production Processes

New metallic alloys can be developed to withstand the fuel cell conditions. Also new methods of producing graphite BSP such as injection moulding are being actively pursued. Composites made of metals and graphite are also studied. The latter category encompasses the use of metallic powder in graphite blends that are later processed in many different ways.

New Metallic Alloys

Since the only requirement that most metallic materials fail to meet is chemical stability in an acidic environment, the use of various metals alloys and metallic coatings for making BSP have been studied. There are generally two main approaches pursued to get around the chemical stability problem. First, a noble metallic coating can be applied on a less expensive substrate. The coatings presented by Woodman et al. in "Development of Corrosion-Resistant Coatings for Fuel Cell Bipolar Plates, Proc. AESF SUR/FIN Annu. Int. Tech. Conf. 1999", 717–725, that are gold over aluminium and gold over nickel over copper over aluminium are a good example of this approach. L. Ma et al. in *J. New Mat. Electrochem. Systems*, 3, 2000, 221, have also studied other coating materials such as TiN. Secondly, existing corrosion resistant alloys have been tested in a fuel cell environment to assess their chemical stability and new metallic alloys have been developed. Austenitic stainless steels containing small amounts of copper like 904 L (N 08904) and N 08926 were investigated by D. P. Davies et al. (*J.Power Sources*, 86, 2000, 237; *J. Appl. Electrochem*, 30, 2000, 101) and R. C. Makkus et al. (*J.Power Sources*, 86, 2000, 274). Also, R. Homung and G. Kappelt (*J. Power Sources*, 72, 1998, 20) studied a novel iron and nickel-based alloys that appear to be promising.

Even if the use of new metallic alloys and metallic coated alloys appears interesting, there are nonetheless a few unanswered questions. Gold plating complicated patterns on BSP is expensive especially if the coating is similar to the best coating produced by Woodman et al. in "Development of Corrosion-Resistant Coatings for Fuel Cell Bipolar Plates, Proc. AESF SUR/FIN Annu. Int. Tech. Conf. 1999", 717–725 which is gold over nickel over copper over aluminium. New, alloys offer a simple solution to the corrosion problem but they also comprise many major potential problems. Complicated alloys containing more than 50% nonferrous additives are costly. Furthermore, all of these alloys would produce multivalent cations if dissolved in the fuel cell, causing contamination of the Nafion® membrane that will cause a decrease in cell performance. Since it is impossible to ensure that a single bipolar plate would not corrode in an entire stack, there will always be a risk when exposed metal is in contact with the electrode.

SUMMARY OF THE INVENTION

It is therefore an object of the present invention to provide a composite useful in the fabrication of BSPs. A further object of the present invention is to provide a process for the preparation of the composite.

According to a first aspect of the invention, there is provided a composite comprising:

a steel substrate having a carbon coating thereon, the carbon coating comprising a carbon layer derived by pyrolysis of an acetylenic polymer having a content of carbon of at least 90 weight %, the carbon layer protecting the substrate against corrosion and improving long term stability of contact resistivity of the substrate, the polymer being soluble at a temperature below 110° C. in an organic solvent, and the carbon layer is contacting the steel substrate.

Chlorobenzene, chloroform, o-dichlorobenzene, N,N-dimethylacetamide, N,N-dimethylformamide, 1,1,2-trichloroethane, 1,1,1,2-tetrachloroethane 1,1,2,2-tetrachloroethane, tetrahydrofuran, xylene and mixtures thereof, are non-limitative examples of organic solvents that can be effective to dissolve the polymer.

According to a second aspect of the invention, there is provided a process for the preparation of a composite comprising a steel substrate having a carbon coating, comprising the steps of:

a) contacting a solution with a steel substrate and coating a film of the solution on a surface of the steel substrate, the solution comprising an acetylenic polymer and a solvent; and b) pyrolyzing the film at a temperature ranging from 600 to 1000° C. to form the carbon coating comprising a carbon layer.

Applicant has found quite surprisingly that by contacting a solution with a steel substrate and coating a thin film of the solution on a surface of the steel substrate, the solution comprising an acetylenic polymer and a solvent; and pyrolyzing the acetylenic polymer film at a temperature ranging from 600 to 1000° C., a low cost composite having a carbon layer protecting the substrate against corrosion and being electrically conducting is obtained.

DETAILED DESCRIPTION OF THE INVENTION

Steel

In the composite according to the first aspect of the invention, the steel can comprise at least 50 weight % of iron and suitably can be selected from the group consisting of 304, 316 and 316 L stainless steel. Preferably, the stainless steel is 316 L. More preferably, the steel substrate is in the form of a plate.

Acetylenic Polymers: Copolymers and Terpolmers

According to the composite of the first aspect of the invention, the acetylenic polymer can suitably comprise, in a first case up to 85 mole % of m-diethynylbenzene or, in a second case, up to 85 mole % of a mixture of p-diethynylbenzene and m-diethynylbenzene. When a mixture of p-diethynylbenzene and m-diethynylbenzene is used, the mixture can comprises from 0 to 35 mole % of p-diethynylbenzene and preferably from 5 to 10 mole %. According to the first case, the polymer can be a copolymer comprising m-diethynylbenzene and a flexibilizing agent effective to enhance solubility of said polymer in said solvent, below 110° C. According to the second case, the polymer can be a terpolymer comprising m-diethynylbenzene, p-diethynylbenzene and a flexibilizing agent effective to enhance solubility of said polymer in said solvent, below 110° C. In both cases, the acetylenic polymer preferably comprises from 15 to 30 mole % of the flexibilizing agent, and more preferably 20%. Suitably the flexibilizing agent is an acetylenic monomer and can be for example a monomer of formula:

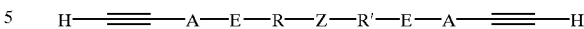

Wherein

A is —$(CH_2)_m$— and m has a value of 0, 1 or 2;

E is O or a single bond;

Z is O, S,

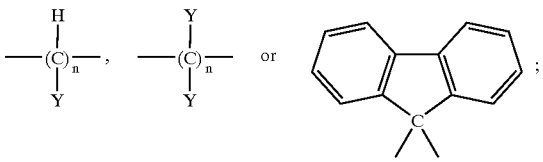

Y is H, $CH_3$ or $C_6$–$C_{12}$ aryl and n has a value of 0 or 1; and

R and R' are —$(CH_2)_p$— or $C_6$–$C_{12}$ arylene and p has a value of 0, 1 or 2, R and R' are the same or different and preferably the same.

Preferably, the $C_6$–$C_{12}$ aryl is

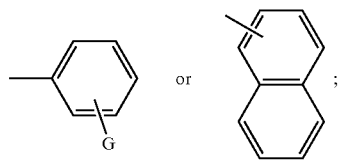

and where G is H, $CH_3$, $CH_2$–$CH_3$ or phenyl.

The $C_6$–$C_{12}$ arylene can be selected from the group consisting of:

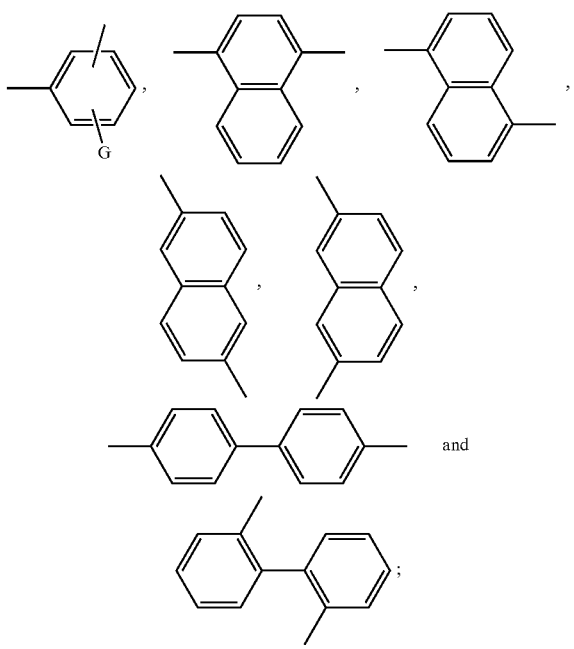

and where G is H, $CH_3$, $CH_2$–$CH_3$ or phenyl.

Preferably, the monomer is selected from the group consisting of

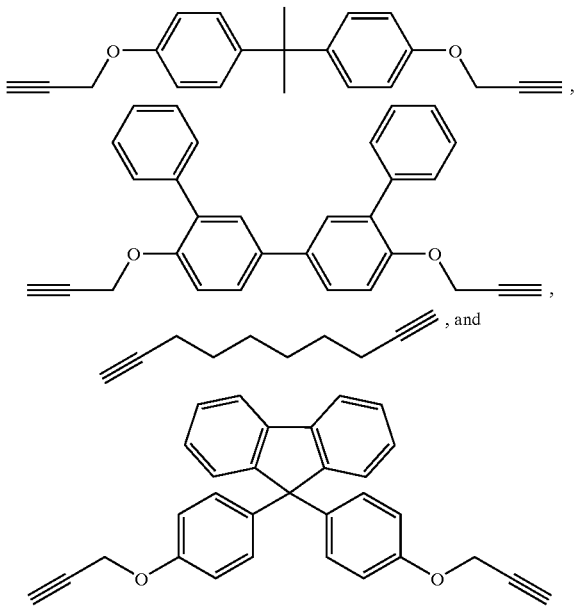

, and

More preferably, the monomer is

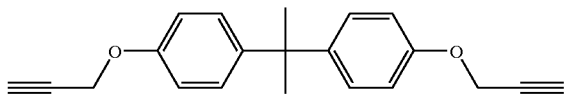

According to the composite of the first aspect of this invention, the solvent is preferably selected from the group consisting of 1,1,2,2-tetrachioroethane, chlorobenzene, o-dichlorobenzene and mixtures thereof. Preferably, the acetylenic polymer is soluble at a temperature below 80° C. More preferably, the solvent is 1,1,2,2-tetrachioroethane and even more preferably, the acetylenic polymer is soluble in a temperature ranging from 50 to 60 ° C. Finally, the acetylenic polymer has preferably a content of carbon from 92 to 97 weight %.

Coating

The coating, of the composite according to the first aspect of this invention suitably has an electrical resistivity below 0.25 Ω-cm. The coating can also comprise an intermediate layer on the carbon layer and an outer layer on the intermediate layer. Preferably, the combination of the carbon layer and the intermediate layer provides a non-porous coating; and the outer layer is effective to protect the intermediate layer. The carbon layer and the outer layer are preferably derived by the pyrolysis of the acetylenic polymer. Also, the intermediate layer preferably comprises pyrolyzed carbon derived by contacting a suspension of particulate carbon in an organic solvent or an aqueous media with the carbon layer to form a film coating, and pyrolising the film coating.

EMI/RFI Shield, Aerodag® G, Electrodag® (109B and Electrodag® 112 are non-limitative examples of suspensions of particulate carbon that can be effective.

More preferably, the suspension comprises particulate carbon selected from the group consisting of carbon black, graphite, acetylene black, Ketjen black and mixtures thereof.

The carbon coating is preferably from 70 to 100 μm thick.

Finally, the coating preferably improves the contact resistance to carbon paper of the substrate.

In the process according to the second aspect of the invention, in step (a) the solution can be sprayed on the surface of the steel substrate to form the film; and the process further comprises after step (a) and prior to step (b):
 a') contacting a suspension of particulate carbon in an organic or aqueous solvent with the film to form an intermediate film on the film;
 a") contacting the solution with the intermediate film to form an outer film on the intermediate film; and
in step (b), the films are pyrolyzed to form the carbon coating comprising the carbon layer, an intermediate layer and an outer layer.

Preferably, in step (a'), the suspension is sprayed on the film to form the intermediate film, and in step (a"), the solution is sprayed on the intermediate film to form the outer film. More preferably, in step (a), the solution is sprayed from 10 to 50 times and even more preferably from 15 to 25 times. In step (a'), the suspension can be sprayed 1 to 5 times and preferably 2 times. In step (a"), the solution can be sprayed from 1 to 5 times and preferably 3 times. Steps (a) and/or (a"), can also comprise a spin coating film of the acetylenic polymer prior to a first spray of the solution. Furthermore, steps (a) and/or (a") can comprise cross-linking the acetylenic polymer using UV light. Preferably, steps (a) and/or (a") comprise cross-linking said acetylenic polymer between each spray of said solution using UV light.

Steps (a) and/or (a") can comprise pyrolyzing the film(s) after each spray of the solution. Preferably, Steps (a) and/or (a") comprise pyrolyzing the film(s) after a last spray of a plurality of sprays of the solution. Step (a') can comprise pyrolyzing the film after each spray of a plurality of sprays of the suspension. Preferably, step (a') comprises pyrolyzing the film after a last spray of a plurality of sprays of the suspension.

The solution can have a high concentration of acetylenic polymer ranging from 20 to 200 mg/mL. Preferably, the solution has a low concentration of acetylenic polymer ranging from 10 to 20 mg/mL. The acetylenic polymer is preferably soluble in an organic solvent at a temperature below 110° C. The solution can also comprise graphite powder or fiber.

The temperature when pyrolyzing is preferably ranging from 600 to 800° C. and more preferably from 700 to 780° C. Pyrolyzing preferably occurs under an inert gas atmosphere and more preferably under argon.

Utilisation of the Composite

The composite of the first aspect of the invention can be used in a corrosive environment. More particularly, the composite can be used in a corrosive environment that comprises an acid selected from the group consisting of phosphonic acid, phosphoric acid, sulfonic acid, sulfuric acid and mixtures thereof. The composite is preferably used in a part of fuel cell hardware and more preferably as a bipolar separator plate (BSP). Even more preferably, the composite is used when an electrical conductivity and a corrosion resistance are required. Finally, the composite can be included in a bipolar separation plate of a fuel cell having electrodes and membranes.

Experimental Section

Polymer Synthesis

The synthesis of those polymers with a high carbon content is hereafter exemplified. In 1960 the synthesis of poly (m-diethynylbenzene) 2 (PEB) was obtained by the oxidative polymerisation of m-diethynylbenzene 1 (Hay, A. S. *J. Org. Chem.* 1960, 25, 1275; Hay, A. S. U.S. Pat. No. 3,300,456, 1967).

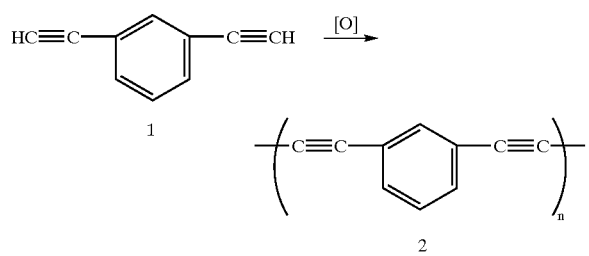

The empirical formula for this polymer is $C_{10}H_4$ and it therefore contains 96.75% of carbon and 3.25% of hydrogen. The polymer can be cast into a transparent film or spun into a fiber. When heated the material begins to cross-link at about 150° C. and then converts to glassy carbon at about 600° C. General Electric set up a pilot plant for this material which was successfully used for the preparation of high modulus, high strength carbon fibers (Krutchen, C. M., Flom, D. G., Gorowitz, B., and Roberts, B. W. "Large Diameter High Strength, High Modulus Carbon Fibers from Polyacetylenes" in 11th Biennial Conference on Carbon. 1973, Gatlinburg, Tenn.). They also obtained several patents in this field U.S. Pat. No. 3,852,235 in 1974, U.S. Pat. No. 3,899,574 and U.S. Pat. No. 3,928,516 in 1975 and U.S. Pat. No. 3,933,722 in 1976). The conversion to graphite fiber required heating in a RF type of furnace at 2800° C. and took place in about 1 minute. Parallel collaborative work at Cosden Petroleum demonstrated that the monomer could be available at reasonable cost. General Electric, however, decided not to commercialise this material.

After the project was terminated very little work on other potential applications was carried out. Films of the material on a substrate could be converted to conducting carbon films and the resistivity obtained varied with the final temperature reached in the heating cycle (Newkirk, A. E., Hay, A. S., and McDonald, R. S., *J. Pol. Sci. A*, 1964, 2, 2217). Subsequent work by Whitesides demonstrated conclusively that glassy carbon can be obtained at temperatures as low as 600° C. (Neenan, T. X., Callstrom, M. R., Scarmoutzos, L. M., Stewart, K. R., Whitesides, G. M., and Howes, V. R., *Macromolecules*. 1988, 3525–8; Neenan, T. X. and Whitesides, G. M., *J. Org. Chem*. 1988, 2489; Neenan, T. X., Callstrom, M. R., Bachman, B. J., McCreery, R. L., and Alsmeyer, D. C., *Br. Polym. J*. 1990. 171). Callstrom later showed that metal nanoparticles could be introduced into the polymers that could be subsequently converted to doped glassy carbons for use as electrodes.

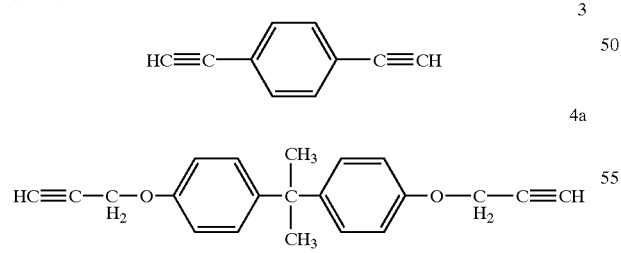

The parent homopolymer crystallises readily and is not soluble in any solvent at room temperature. Films must be cast from a solvent such as chlorobenzene at >110° C. Copolymers and terpolymers were prepared to break up the regularity of the molecule and therefore increase the solubility. Small amounts of p-diethynylbenzene 3 and the propargyl ether of bisphenol-A 4a were incorporated into the polymer which gave increased solubility at lower temperatures so that the polymer solution could be easily melt extruded (White, D. M., U.S. Pat. No. 3,821,153, 1974). This lowered the carbon content of the polymers by a few per cent but the conversion to graphite was still satisfactory. The homopolymers of a series of dipropargyl ethers that were previously prepared and were very photosensitive and cross-linked readily under ultraviolet light (Hay, A. S., Bolon, D. A., Leimer, K. R., and Clark, R. F *J. Pol. Sci. B*, 1970. 8, 97; Hay, A. S., Bolon, D. A., and R. Leimer, K. *J. Pol. Sci. A*-1, 1970 8, 1022). Some work was also done on adding plasticizers, which also had high carbon contents, to the polymer so that moulded structures could be prepared.

For the present applications even greater solubility of the polymer than for those described above was required so that the coating could be applied at low temperatures to simplify the processing. This required the synthesis of further copolymers, terpolymers, with other diethynyl compounds to optimise the solubility and to maintain the high carbon content in the polymers. Larger amounts of dipropargyl compounds, e.g. 4a–c containing large, bulky aromatic groups (Ar) or aliphatic diacetylenes, e.g. 5, were the simplest choice to break up the regularity in the

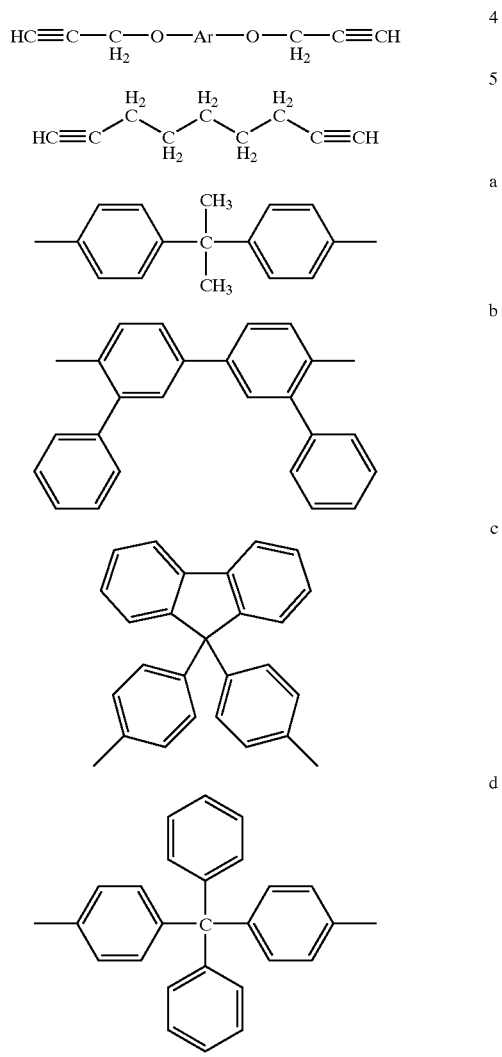

structure to give more soluble materials.

In the following tables it is demonstrated that polymers 6 and 7, soluble at room temperature, can be obtained by copolymerizing with about 20 per cent of a dipropargyl derivative of various bisphenols or with an aliphatic diyne.

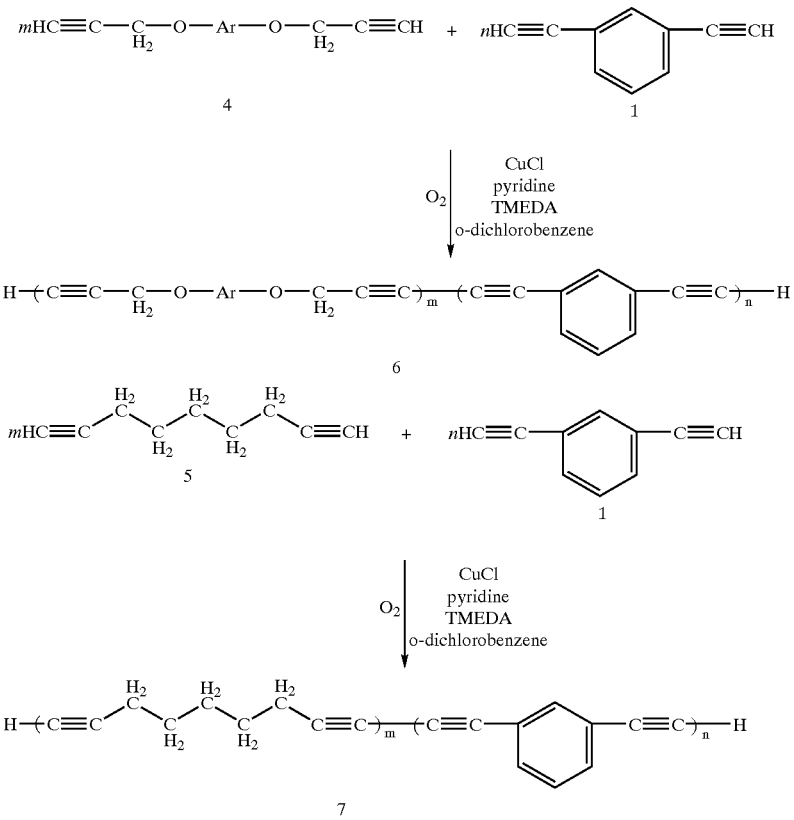
The polymers obtained, as shown below in table 1, were all very high molecular weight and could be cast into tough, flexible films.
| | Ar= | carbon content, wt % | explosive temp. °C. | $M_n$ | $M_w$ | Pd |
|---|---|---|---|---|---|---|
| A | (1,4-phenylene) 20 mol % | 91.80 | | 20,231 | 78,324 | 3.87 |
| B | (tetraphenylmethane) 15 mol % | 93.17 | 175.0° C. | 9,159 | 35,175 | 3.84 |
| C | (2,2-diphenylpropane) 10 mol % 20 mol % | 93.84 91.75 | 186.0° C. 191.0° C. | — 28,058 | — 101,330 | — 3.61 |

| Ar= | carbon content, wt % | explosive temp. °C. | $M_n$ | $M_w$ | Pd |
|---|---|---|---|---|---|
| D | 93.22 | 178.0° C. | — | — | — |
|   | 92.60 | 186.4° C. | — | — | — |
|   | 15 mol % |   |   |   |   |
|   | 20 mol % |   |   |   |   |
| E | 94.59 | — | — | — | — |
|   | 92.49 | — | 29,570 | 83,719 | 2.83 |
|   | 10 mol % |   |   |   |   |
|   | 20 mol % |   |   |   |   |
| F | 95.21 | — | 27,650 | 75,663 | 2.74 |
|   | 20 mol % |   |   |   |   |
| G | 95.40 | — | 10,196 | 34,699 | 3.40 |
|   | 20 mol % |   |   |   |   |
| H | 95.80 | 176.4° C. | 5,068 | 25,713 | 5.07 |
|   | 10 mol % |   |   |   |   |
|   | 10 mol % |   |   |   |   |

C is Ar used in M2-48
D is Ar used in M-56
G is Ar used in M2-61
E is Ar used in M2-62
Monomers A to E were synthesized.
Monomers F to H were brought of the shelf.

Preparation of Dipropargyl ether 4c

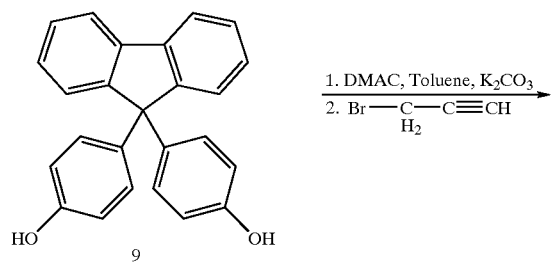

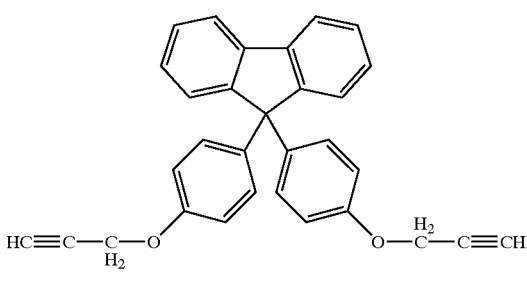

A typical example is given as follows. To a dry 100 mL three neck flask equipped with a Dean-Stark trap, water condenser, a magnetic stirrer, and a nitrogen inlet, biphenol 9 (5 g, 14.00 mmol), anhydrous potassium carbonate (4,83 g, mmol), toluene (20 mL) and DMAC (30 mL) were charged. Under an atmosphere of nitrogen, the solution was heated and maintained at 145° C. for 2 h to remove all water by means of azeotropic distillation with toluene. The reaction mixture was cooled down to room temperature, and there was added (1.83 mL, 16.80 mmol) of propargyl bromide dropwise over a 10 min period. The reaction mixture was stirred at 70° C. for about 2 h. HPLC analysis showed that all the starting material had disappeared. The resulting mixture was cooled and poured into 200 mL of water to precipitate out the product. The product was collected by filtration, and purified by recrystallization three times from ethyl acetate and methanol (3-1) to afford a white powder in 86% yield. Purity: 98.5% (by HPLC) MALDI-TOF-MS: 426.3 (Calc: 426.51). The other dipropargyl ethers which have been reported previously (Hay, A. S., Bolon, D. A., Leimer, K. R., and Clark, R. F. *J. Pol. Sci. B*, 1970, 8, 97) were prepared in the same manner.

Preparation of Homopolymer 2

This is a modification of previous procedures used for the preparation of this polymer (Hay, A. S. *J. Org. Chem.* 1960, 25, 1275; Hay, A. S. U.S. Pat. No. 3,300,456, 1967; White, D. M., Hay, A. S, *Macromolecular Synthesis*, 1973, vii, 11). To a 250 mL wide-mouthed Erlenmeyer flask equipped with an oxygen inlet tube, vibromixer stirrer, and a syringe inlet in an oil-bath at 60° C. was added 50 mL of o-dichlorobenzene, 0.3 g of copper (I) chloride, 0.5 mL of N,N,N',N'-tetramethylethlyendiamine and 3 mL of pyridine. Oxygen was bubbled into the solution, which was vigorously stirred. Over a 30 min. period, 4.55 g of m-diethynylbenzene 1 was added via the syringe. The temperature of the reaction mixture rapidly rose to 110°–112° C. After the addition was complete, the reaction was continued for 15 min. The polymer solution was diluted with 50 mL of o-dichlorobenzene and the polymer precipitated into 100 mL of methanol with 10 mL HCl, and than stirred for 1 h. After filtering and drying a pale yellow fibrous polymer obtained in quantitative yield.

Preparation of Polyacetylene 6a Containing 20% BPA Dipropargyl Ether 4a

A mixture of 10 mL of o-dichlorobenzene with dissolved 2,2 bis-(propargyl oxyphenyl) propane (BPA) 4a (1.2175 g, 4 mmol) and m-diethynylbenzene 1 (2.0184 g, 10 mmol) was prepared. This mixture was added dropwise over 30 min to a solution at 50° C. of the pre-mixture of 30 mL of o-dichlorobenzene containing copper (I) chloride (0.15 g), N,N,N',N'-tetramethylethlyendiamine 8 drops, and 1.5 ML of pyridine. The temperature increased very slowly from 50° C. to 75° C. after addition. The reaction was maintained at this temperature for another 10 min. The reaction mixture became very viscous. The polymer solution was diluted with 50 mL of o-dichlorobenzene and the polymer precipitated into 100 mL of methanol, and than stirred for 1 h. After filtering and drying a white fluffy fibrous polymer was obtained. The properties are previously shown in the table. The other copolymers were prepared in the same manner.

Experimental Part

After having reviewed the state of the available technology for making BSP, it appears that none of the proposed solutions was adequate. It was also clear that a new material and a new way of producing BSP were both needed to fulfil the requirements previously stated. The technology proposed herein consists of protecting steel using a carbon coating. This method allows producing a BSP that exploits the bulk mechanical properties of steel while being protected by a carbon layer that is chemically stable. The electrical conductivity of the resulting protected plate should be quite similar to the conductivity of the stainless steel.

To produce carbon coatings, it was proposed that a high carbon content polymer be pyrolyzed on the surface of the steel. A polymer that had been studied for producing carbon fibers in the 1960's, poly (m-diethynylene benzene), was thought to be a good choice for preparing the coating. When heated at a rate of 1° C./min, this polymer produces a black residue with a yield of over 90% (A. E Newkirk, A. S. Hay, R. S McDonald, *J. Pol. Sci. A*, 1964, 2, 2217; A. S. Hay, U.S. Pat. No. 3,300,456, 1967). This residue carbon content is in excess of 95% (A. S. Hay, *J. Org. Chem.*, 1960, 25, 1275). It was also reported that uniform films could be cast from a poly (m-diethynylene benzene) solution. Combined, these properties would mean that a large amount of polymer would be transformed into carbon, making the production of a pinhole free film possible. Unfortunately, poly (m-diethynylene benzene) is only soluble at high temperature in selected solvents. For example it can be dissolved in o-dichlorobenzene at around 120° C. To reduce the complexity of handling this polymer, copolymers containing poly (m-diethynylene benzene) were synthesised. These copolymers are soluble in solvents such as 1,1,2,2 tetrachloroethane and tetrahydrofuran at relatively low temperatures (25° C. to 80° C.) which makes them easier to work with.

BRIEF DESCRIPTION OF THE FIGURES

Further features and advantages of the invention will become more readily apparent from the following Figures wherein.

DETAILED DESCRIPTION WITH REFERENCE TO DRAWINGS

Figure 1:
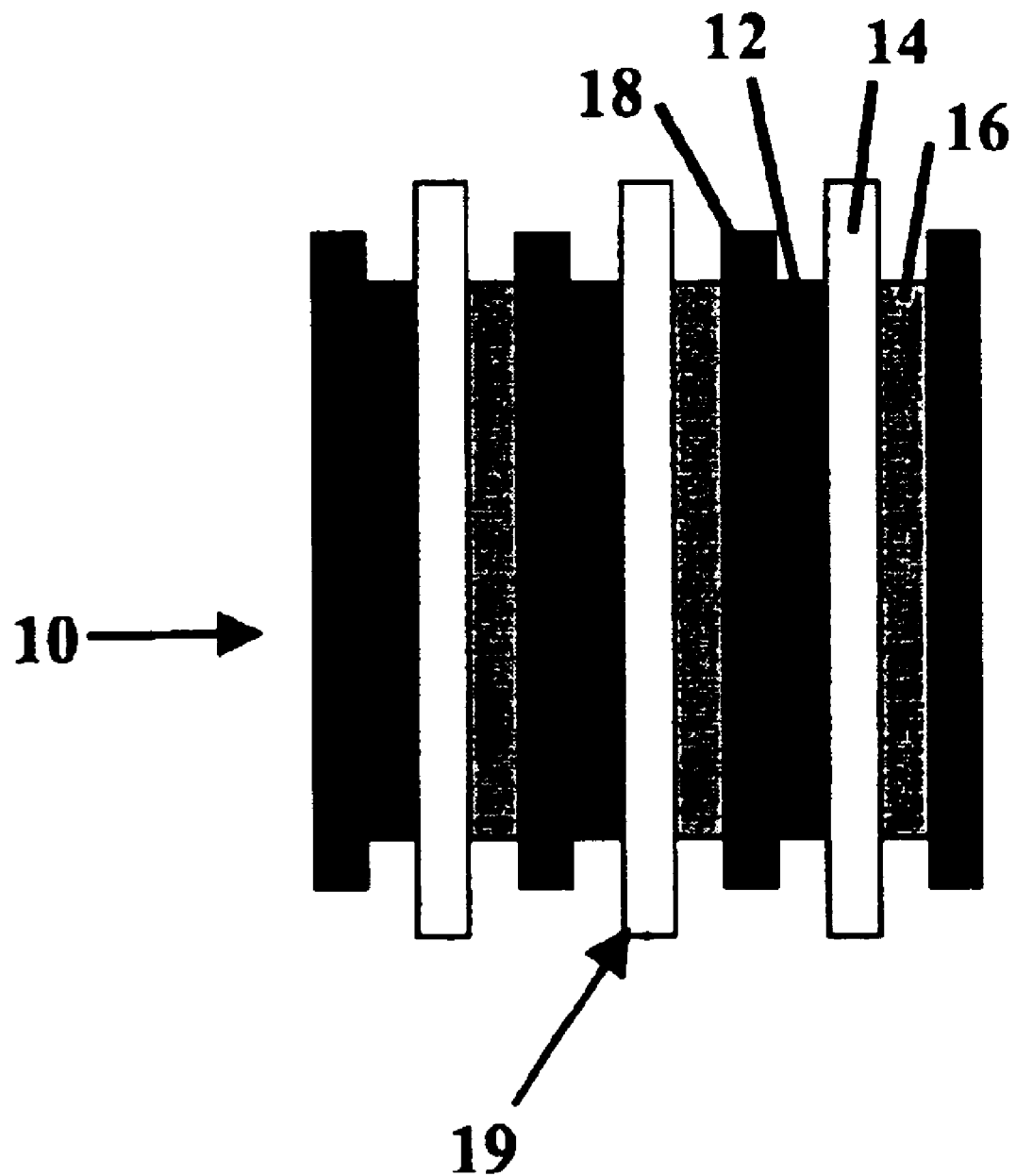
FIG. 1 is a schematic front view of a proton exchange membrane fuel cell stack.

Referring first to FIG. 1, there is shown a proton exchange membrane fuel cell stack 10 comprising cells 19 assembled in series. Each cell 19 has an anode 12 on one face of a membrane 14 and a cathode 16 on the other face of the membrane 14. Cells are separated by a bipolar separator plate 18.

Figure 2:
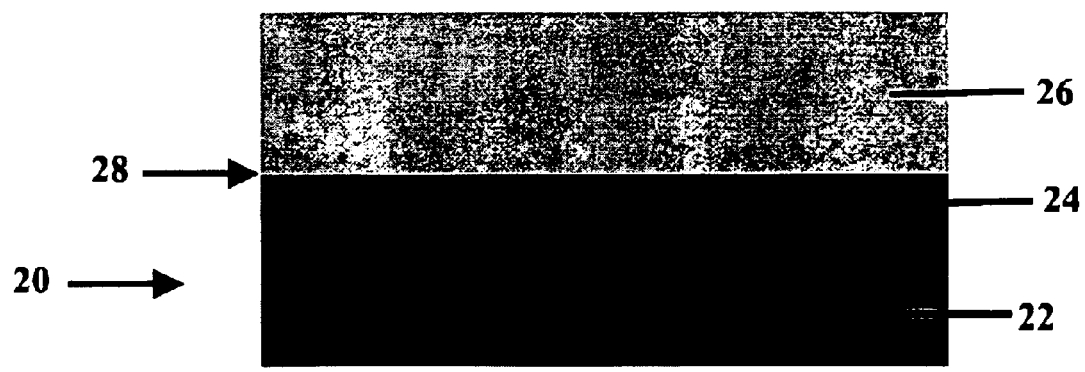
FIG. 2 is a schematic sectional view of a composite according to a preferred embodiment of the invention.

FIG. 2 illustrates a composite 20 according to the following invention and the composite 20 comprises a stainless steel substrate 22 having a coating 28 thereon. The coating 28 further comprises a carbon layer 24 made of a pyrolyzed film of M2–48, and an intermediate layer 26 made of a pyrolyzed film of EMI/RFI Shield.

Figure 3:
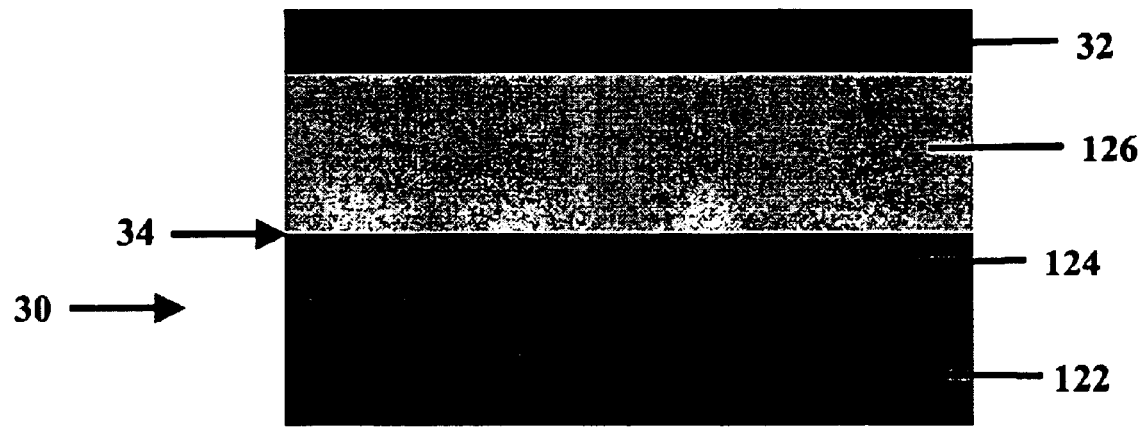
FIG. 3 is a schematic sectional view of a composite according to the most preferred embodiment of the invention.

FIG. 3 illustrates a composite 30 according to the following invention and the composite 30 comprises a stainless steel substrate 122 having a coating 34 thereon. The coating 34 further comprises a carbon layer 124 made of a pyrolyzed film of M2-48, an intermediate layer 126 made of a pyrolyzed film of EMI/RFI Shield and an outer layer 32 made of another pyrolyzed film of M2-48. The stainless steel substrate, the carbon layer and the intermediate layer of FIG. 3 are the same than those of FIG. 2. Their reference numbers (of FIG. 2) have been increased by 100 in FIG. 3.

Experimental Protocols

The following examples given in a non-limitative manner are focused on the method of producing carbon coated stainless steel 316 L BSP from various synthesised polymers as well as an analysis of their structure and electrochemical stability.

Method for Producing Unsupported Polymer Films i) Dried polymer was weighed in a beaker.

ii) Then 1,1,2,2 tetrachloroethane was added and the solution concentration was approximately 3 mg/ml.

iii) The solution was heated on a hot plate until complete dissolution of the polymer.

iv) The solution was then poured equally into three 30 ml crystallizing dishes.

v) The dishes were then placed on the hot plate at a constant temperature of 50° C.

vi) When the solution thickened, the dishes were gently stirred.

vii) When the solution was too thick to be stirred the dishes were taken off the hot plate and put on an even surface.

After at least 6 hours of drying at room temperature, distilled water was poured into the dishes and the film removed from the dishes with a knife. The film had a tendency to float and if the integrity of the seal between the film and the glass was broken at the edge of the film, it could be easily removed in water. The films were then stored in a covered plastic dish until needed.

Heat Treatment Procedure

The first step was cutting a portion of the produced films that was as homogeneous as possible. It was sometimes hard to get films of a constant thickness and it was impossible to have samples of the same shape and area. The effects of this problem will be discussed later.

Once cut, the samples would be placed between two quartz substrates.

This "sandwich" was then placed in the quartz tube.

The tube was sealed once all the films were in the tube.

The tube exit valve was closed.

The vacuum pump was then hooked on and the pump valve opened.

The pump was turned on until the pressure dropped to 40 mbar

The pump valve was closed.

The argon supply valve was then opened.

Once the pressure was 1000 mbar the argon supply valve was closed.

This vacuum procedure was repeated 4 more times in order to ascertain an inert atmosphere in the quartz tube.

At the end of the vacuum procedure, the pump was disconnected.

The argon supply valve and the tube exit valve were then opened.

The argon flow was kept constant at 200 ml/min.

The oven controller was then programmed for the right temperature and ramps.

The timers were set accordingly.

An Example of the Heat Treatment that was Used is Given Below.

23° C. to 150° C.@1° C./min 2 h@150° C.

150° C. to 205° C.@1° C./min 2 h@205° C.

205° C. to T° C.@1° C./min (T being the appropriate temperature)

H hours@T° C. (H being the appropriate time)

Cooling to room temperature@1° C./min.

When mentioning a temperature, it is important here to realize that it is the temperature measured by a thermocouple at the surface of the oven's heating coil. Since it takes hours for the oven to reach 800° C., it is assumed that it is also the tube temperature.

Spraying Methods for Covering Stainless Steel 316 L with a Polymer Film

It was proposed that perhaps one could spray a solution of polymer onto the stainless steel substrate to produce a film. The apparatus used is an airbrush from a miniature model company (Badger® model 200) made entirely of polytetrafluoroethylene (PTFE). This apparatus was necessary since some of the solvents used to solubilize said acetylenic polymers attack almost all known polymers and even some metal oxides such as aluminium oxide. The general method used to prepare the coated substrates is quite simple. This method is the same as described below concerning some preferred embodiments of the following invention.

Figure 4:
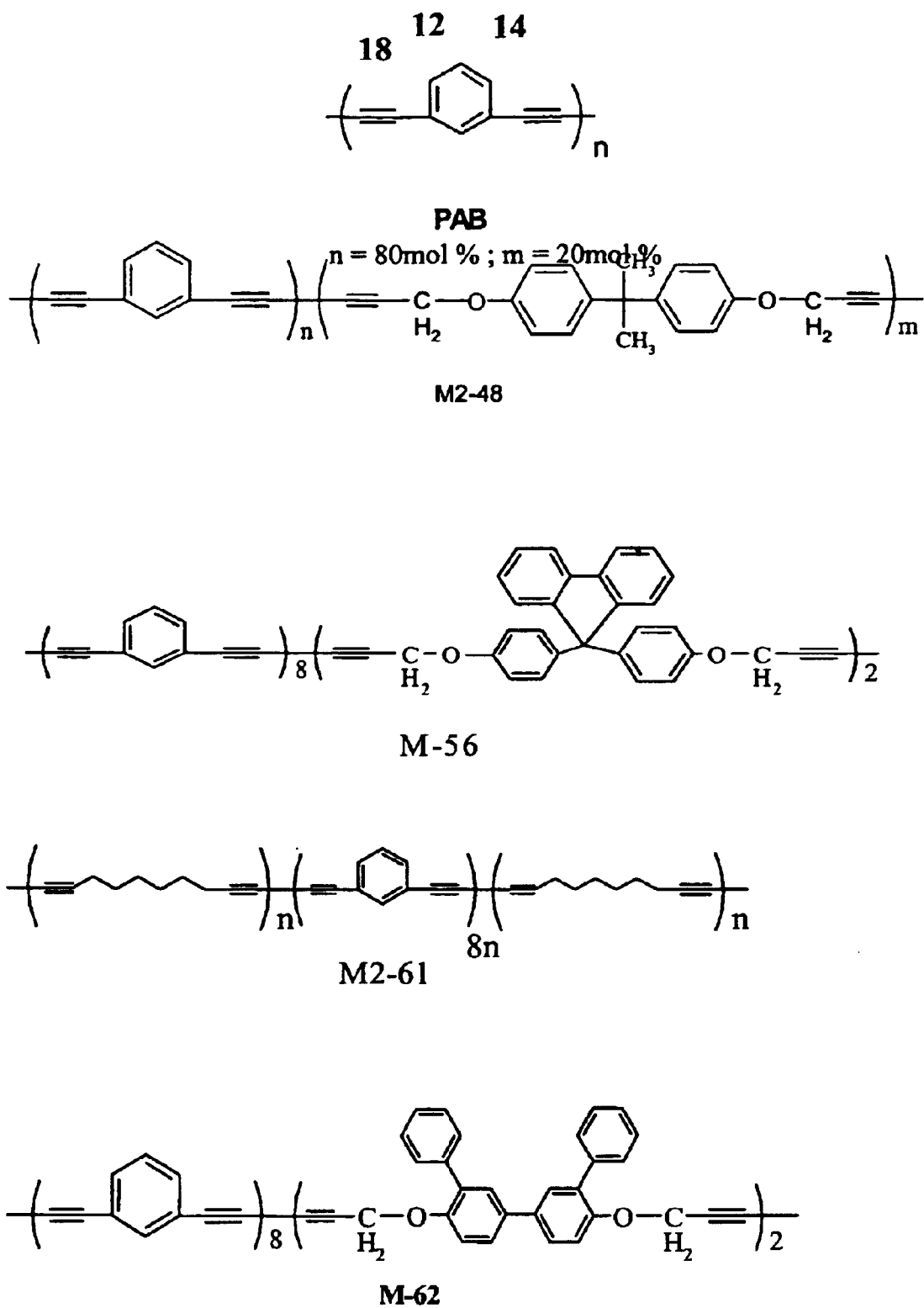
FIG. 4 comprises acetylenic polymers used in composites in some preferred embodiments of the invention.

Method A i) The stainless steel 316 L substrate was prepared by being immersed in sulfo-chromic acid for 3 hours and then rinsed with distilled water and dried with dry compressed air.

ii) A solution of M2-48 (see FIG. 4) in 1,1,2,2-tetrachloroethane of a chosen concentration was prepared.

iii) The solution was heated at 55° C. and once the polymer was entirely dissolved, the solution was filtered through a paper filter and poured into the reservoir of the airbrush.

iv) The reservoir was kept hot on the hot plate until the substrates were ready.

v) The reservoir was then attached to the airbrush and spraying of the solution was carried out to generate a film.

vi) Heat treatment (or pyrolysis) is then applied to the film at a temperature of 750° C. to obtain said coating.

High concentration (20–200 mg/mL) as well as low concentration (10–20 mg/mL) were used. The solution was usually sprayed from 10 to 50 times and best results were obtained when spraying 15 to 25 times. For example, spraying 20 times at a concentration of 20 mg/ml of polymer M2-48 (see FIG. 4) produced the best results. Pyrolysis was carried out as mentioned before.

After having produced a number of samples using the spraying technique described above, the samples were tested. Some encouraging results were obtained and also, from this method another method to prepare the films was developed. Few supplemental steps on the spraying techniques were added to method A, and method B was obtained. In method B three films are sprayed and then pyrolyzed to obtain a coated substrate having three layers. Said three layers are: a carbon layer generated from the film, an intermediate layer generated by the intermediate film and an outer layer generated by the outer film.

Method B i) The stainless steel 316 L substrate was prepared by being immersed in sulfo-chromic acid for 3 hours and then rinsed with distilled water and dried with dry compressed air.

ii) A solution of M2-48 (see FIG. 4) in 1,1,2,2-tetrachloroethane of a chosen concentration was prepared.

iii) The solution was heated at 55° C. and once the polymer was entirely dissolved, the solution was filtered through a paper filter and poured into the reservoir of the airbrush.

iv) The reservoir was kept hot on the hot plate until the substrates were ready.

v) The reservoir was then attached to the airbrush and spraying of the solution was carried out to generate a film.

vi) A suspension of carbon particulate (EMI/RFI Shield) was sprayed on the film to generate an intermediate film.

vii) The solution was then sprayed on the intermediate film to generate an outer film.

viii) Heat treatment (or pyrolysis) is then applied at a temperature of 750° C. to the films to obtain the coating.

The suspension of carbon particulate, EMI/RFI Shield, has a high sheet resistivity so electrochemical process cannot be carried out easily on its surface. However, this product is made of a polymer dissolved in a solvent with a graphite particulate dispersed in it. It was believed that once pyrolyzed the only remaining material would be the graphite with polymer fragments. The structure of the intermediate layer is therefore less rigid than the structure of the carbon layer allowing for a greater resistance to thermal shocks. This is the main interest when using a suspension of carbon particulate, besides the possibility that it may fill up any pinholes in the underlying carbon layer. EMI/RFI Shield is a simple product to use since it is already compressed in a spray bottle and ready to use. Usually, from 1 to 5 sprays of suspension of carbon particulate are required and preferably 2.

In a preferred embodiment, in step (v), the solution of M2-48 in 1,1,2,2-tetrachloroethane was sprayed 20 times and in step (vii) it was sprayed 3 times. In step (vi) the EMI/RFI Shield was sprayed 2 times. On FIG. 3, a drawing of this coating can be seen.

Adding a Spin-coating Step before or after Spraying the Acetylenic Polymer Solution.

In methods A and B a spin coating film can further be added. In method A, it can be added before or after step (v). In method B, it can be added before or after steps (v) and (vii). The spin coating film was prepared as follows:

i) A solution of 20 mg/ml of M2-48 in 1,1,2,2-tetrachloroethane was prepared.

ii) The solution was heated at 55° C. and once the polymer was entirely dissolved, the solution was filtered through a paper filter.

iii) The solution was left on the hot plate until the polymer started to precipitate.

iv) Spin coating was done at a speed of 800 RPM for 15 seconds.

Increasing the spinning time or the rotation speed had little effect. Improved results were obtained by carrying out the first step at 800 RPM for 15 seconds, and allowing the substrate to stop rotating by itself. As soon as the substrate stopped, a second step of 15 seconds at 1100 RPM was added. The excess polymer on the edges of the substrate was effectively removed by this second step.

Conductivity Test (Four Points Probe Tests)

The measurement of the conductivity was performed using the ASTM method -F 1529-97.

X-ray Diffraction (XRD)

XRD was performed using a Brukner AXS model D8 advance diffractometer. The source used was made of copper and a Göebel mirror was used to focus the incoming beam. The angle of the incident beam was kept constant at 5 degrees. In this grazing angle configuration.

Electrochemical Tests

Once stainless steel 316 L substrates had been protected, a method of testing their chemical stability in a fuel cell environment was designed.

A fuel cell can be simulated using a number of different parameters. Furthermore, once a coating could resist the simulated fuel cell environment, it was also necessary to prove that a simple electrochemical reaction can take place on the surface of that coating. This last test helped us identifying protective non-conductive from conducting coatings. This is important since using non-conducting coatings in a fuel cell would drastically reduce its efficiency. To be able to clearly identify chemically stable and conductive films, two tests were performed: potentiostatic test and ferri-ferro cyanide test.

Potentiostatic Tests

A potentiostatic test was used to assess the chemical stability of the films. In a potentiostatic test, the potential is kept constant and the current measured. The current will be function of the electrochemical process reaction rate. The faster the reaction rate the higher the current. Identification of very slow processes is therefore difficult since the current proportional to that process is small. The choice of the conditions has been taken in account the necessity of producing a significant current. In this case, the conditions were chosen so that the steel would be in its trans-passivation region (O. J. Murphy, S. Srinivasan, B. E. Conway, Electrochemistry in Transition from the $20^{th}$ to the $21^{st}$ Century, Plenum Press, 1992, 526). The potential applied was accordingly 1,23 V vs. standard hydrogen electrode (SHE) and the electrolyte was a (0.5M) sulphuric acid solution. In standard conditions, the highest potential possible in a PEM fuel cell is also 1,23V vs. SHE. The test was performed in a home made version of the EG&G flat cell model K-0235. To simulate anodic and cathodic environment, hydrogen and air were respectively bubbled in the solution.

Ferri-ferro Cyanide System

A low current in the potentiostatic test is not a guarantee that the carbon coating is well suited for making BSP. As it was mentioned earlier on, the carbon coating must be as conductive as possible. At this point, another test, the ferri-ferro cyanide test, was performed on the coated substrate. This test is very simple. A small amount of ferricyanide is dissolved in a conductive solution. The potential is then swept across a predetermined range. The difference between the oxidation and reduction peak of the iron ion can be measured. Ideally, 60 mV (A. J. Bard, "Electrochemical methods", John Wiley & Sons, 1980, 229) separates both peaks. If the potential is much higher than 60 mV, the material should not be considered for making BSP. The cell used for this test was the same as the one used for the potentiostatic test. The solution used was 0,5M $K_2SO_4$ in which 10 mM of ferricyanide was added.

Cleaning the Electrochemical Equipment

To ensure that no contaminants will disturb the precise measurements, the electrochemical equipment must be cleaned before each test. The method employed is described below.

i) The lab ware was thoroughly rinsed with deionized water to remove al soluble contaminants.

ii) A fresh solution of hydrochloric and nitric acid was prepared (50% vol./50% vol.).

iii) The lab ware was immersed in this solution for at least 30 minutes.

iv) The cell was then rinsed with deionized water.

v) The last step was to rinse the lab ware with the solution to be used in the next experiments, for example with a solution of 0.5M $H_2SO_4$.

In-situ Fuel Cell Test

This section will described the in-situ fuel cell test. The assembly of the fuel cell and a description of the fuel cell tests is also presented.

MEA (Membrane Electrode Assembly)

The MEA used during the in-situ fuel cell tests were assembled using a well-known hot-pressing method (H. Wang, R. Côté, G. Faubert, D. Guay, J. P. Dodelet, *J. Phys. Chem. B*, 103, 1999, 2042). The base material for the MEA was Nafion® 112 for the membrane and 10 thousandths of an inch thick Toray paper with a Pt loading of 1.2 mg/cm$^2$. The press was heated to 138° C. while the membrane was put between two pieces of the carbon paper. The assembly was then put in a frame and placed on the hot carver press. The MEA was heated for 1 minute and then pressed for 1 more minute at a pressure of 5000 PSI.

Fuel Cell Assembly

The fuel cell was assembled using the following procedure.

i) The flow channels were placed in the end plates.

ii) A Teflon gasket was placed properly aligned on both en plates.

iii) With the aid of two plastic guides, the MEA was positioned on one of the gasket-covered end plate.

iv) The second end plate was then slid unto the first one using the guides for positioning.

The final result was that the MEA was between two gaskets isolating the plates. The entire assembly was pressed together using an isolated C shaped clamp and a vice.

Fuel Cell Tests Description

In-situ fuel cell tests were carried out using a Fuel Cell Technologies 300 W test station. All the tests used the same station with the same parameters, which are listed below.

The cell temperature was maintained constant at 70° C.

The grade 5.0 Hydrogen flow was 80 standard cubic centimeter per minutes (sccm).

The hydrogen was bubbled in a bottle containing deionized water at 80° C.

The compressed air flow was 475 sccm.

Polarisation curves were measured at defined intervals using the same parameters.

The results were stored in a computer.

The test station was always supervised. In order to do so the test station was started at the beginning of the day and turned off at the end of the day. This in effect created a number of start/stop cycles that could influence the results. However, it represents a real application were the fuel cell is not always under load.

Physical Characterisation of Unsupported Films

Conductivity Testing:

The first step in this evaluation was to identify the polymer that will best suit our need. To accomplish this, several polymers (see FIG. 4) were cast into thin films and pyrolyzed at different temperatures. The results of the heat treatments are depicted in Table 2.

TABLE 2

Resistivity in (Ohm cm) corrected for the shape factor as a function of the time and the temperature of pyrolysis.

| Time of Pyrolysis | Polymer (see FIG. 4) | 600° C. | 700° C. | 800° C. | 850° C. |
|---|---|---|---|---|---|
| 3 h | PAB |  |  | 0.021 | 0.013 |
|  | M2-48 |  |  | 0.021 | 0.018 |
|  | M-56 |  |  | 0.036 | 0.017 |
|  | M-61 |  |  | 0.059 | 0.018 |
|  | M2-62 |  |  | 0.24 | 0.052 |
| 6 h | PAB | 170 | 0.14 | 0.016 |  |
|  | M2-48 | 870 | 0.065 | 0.051 |  |
|  | M-56 | 30 000 | 0.150 | 0.036 |  |
|  | M-61 | * | 1.5 | 0.034 |  |
|  | M2-62 | 130 000 | 4.0 | 0.029 |  |
| 12 h | PAB | 23 | 0.100 | 0.019 |  |
|  | M2-48 | 23 | 0.068 | 0.038 |  |
|  | M-56 | 1060 | 0.080 | 0.024 |  |
|  | M-61 | & | 0.12 | 0.036 |  |
|  | M2-62 | 750 | 0.19 | 0.023 |  |

* = Resistivity higher than the apparatus can measure.
& = The films were broken during the heat treatment.

The numbers presented in Table 1 are an average of the resistivities of at least 3 films. Only the order of magnitude of the results should be considered when comparing different films.

Results from table 2, indicate that the resistivity appears to generally decrease with the time of pyrolysis and with the increase in the pyrolysis temperature. The temperature at which the pyrolysis is conducted seems to be more important than the time that the sample is kept at that temperature. For a given time, one can achieve lower resistivity by increasing the temperature.

XRD Characterization

In the XRD characterization section unpyrolyzed polymer films, pyrolyzed M2-48 and pyrolyzed PAB are analyzed.

XRD Characterization of Unpyrolyzed Polymer Films

Figure 5:
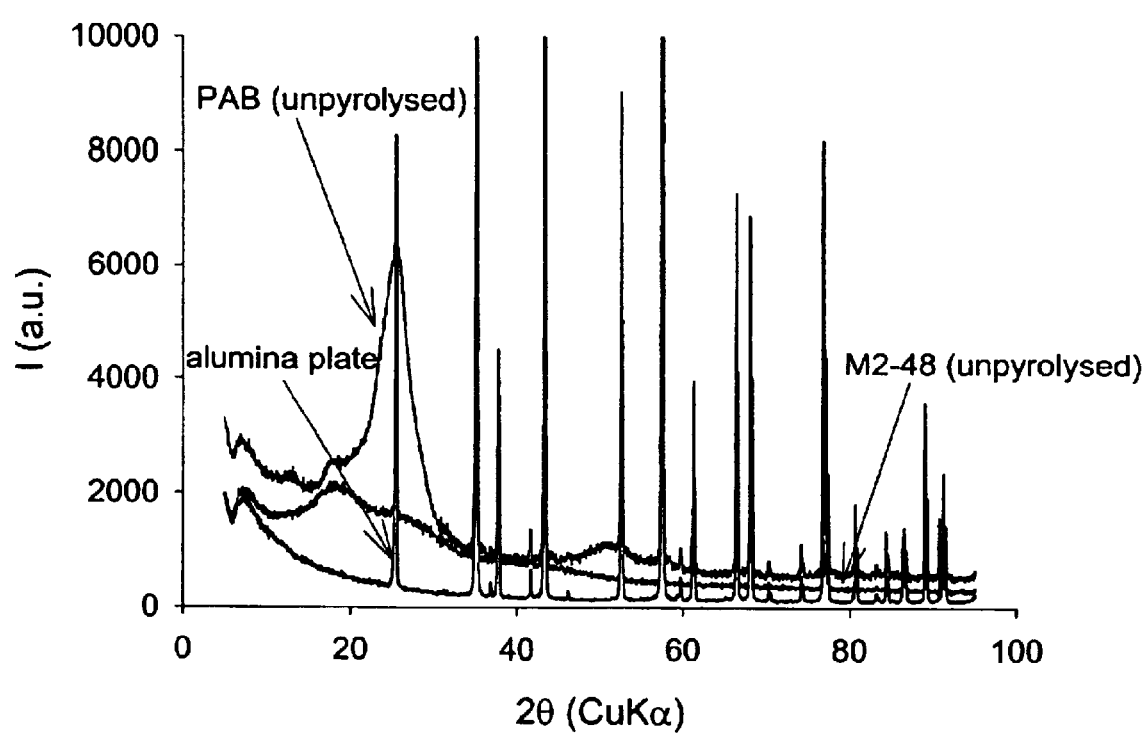
FIG. 5 is a graph representing the X-ray diffraction (XRD) pattern of some composites according to the invention.

One of the interesting applications of XRD is to determine the degree of crystallinity of a given polymer. Since a highly crystalline polymer is also more regular, it will most likely be harder to dissolve. This polymer will also be more difficult to handle when using the airbrush. In the present case, two polymers have opposite behaviours. Poly (m-diethynylene benzene) which is the base polymer, also called PAB, is very hard to dissolve and becomes even harder to dissolve when it has been synthesised for some time. On the other hand, M2-48 is much less difficult to dissolve and is more stable over time. One would expect XRD diffraction patterns of PAB to be more representative of a crystalline structure than the XRD patterns of M2-48. Using the method described in the experimental section to attach the film on the alumna plate, unpyrolyzed freestanding films of both polymers were analysed. The results are depicted in FIG. 5. To be able to perform XRD on unsupported polymers they were attached to an alumna plate. XRD was also performed on the bare alumna plate substrate. This diffractogram was added to FIG. 5 for comparison. The alumna plate substrate does produce number of sharp peak starting at around 25 degrees. They can therefore be used as a reference during our studies.

Pyrolyzed Polymers Analysis

Figure 6:
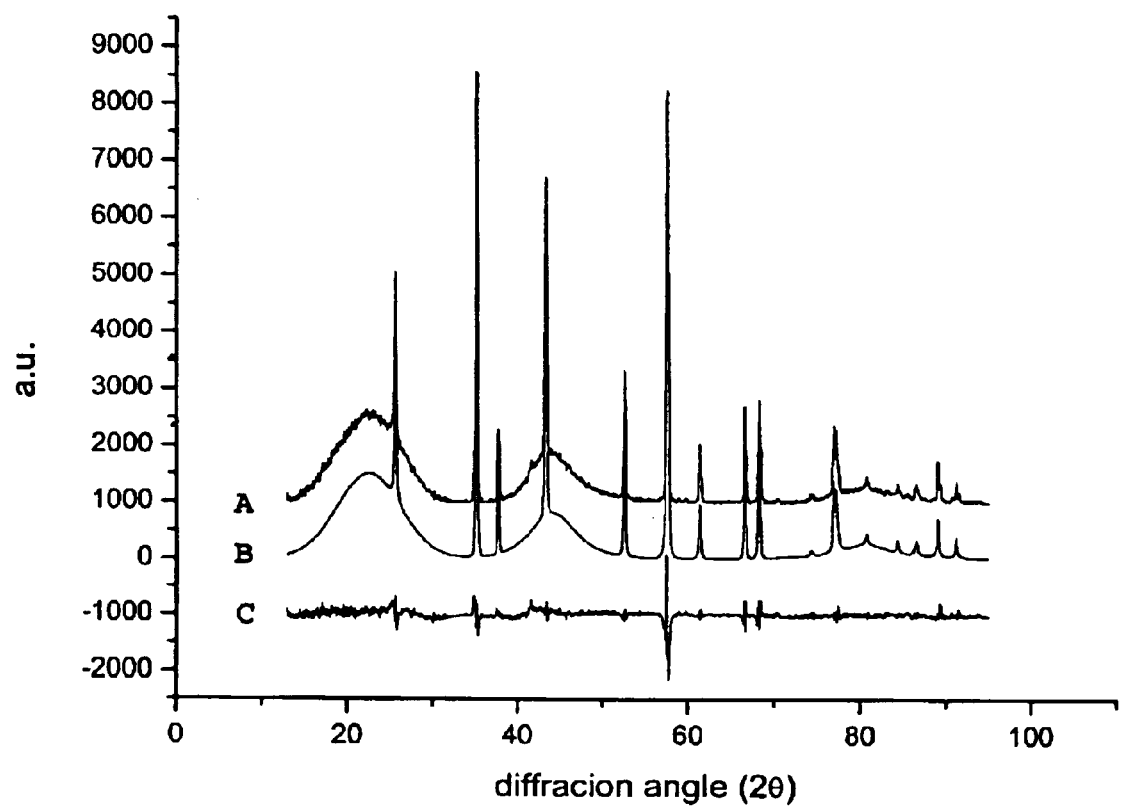
FIG. 6 is another graph representing the X-ray diffraction (XRD) pattern of some composites according to the invention.

Polymer M2-48 was the first one to be analysed. It was pyrolyzed using the method described earlier for two hours at 500, 600, 750 and 900° C. The pyrolyzed polymer was placed on an alumina plate as described in section. FIG. 6 presents the XRD patterns of M2-48 pyrolyzed at 900° C. where one can see the peak fitting done using the software TOPAS and the difference between both patterns.

A similar analysis was performed for all pyrolysis temperature. To make the analysis easier, table 3 was constructed with the following information on the peaks found for each pattern: position of the centre of the peak, corresponding spacing and FWHM.

TABLE 3

Position, spacing and the full width at half maximum of peaks for M2-48 pyrolyzed between 600 and 1000° C.

| | (002) | | | (100) | | |
|---|---|---|---|---|---|---|
| T (° C.) | 2 theta (°) | d (002) (Å) | FWHM | 2 theta (°) | d (100) (Å) | FWHM |
| 600 | 20.8722 | 4.25580 | 6.770 | 43.8961 | 2.06250 | 8.000 |
| 650 | 21.2702 | 4.17706 | 7.669 | 43.5059 | 2.08008 | 7.309 |
| 700 | 21.9483 | 4.04951 | 6.993 | 43.7345 | 2.06974 | 6.685 |
| 750 | 21.8511 | 4.06731 | 8.360 | 43.5942 | 2.07608 | 7.018 |
| 800 | 22.4126 | 3.96666 | 8.899 | 43.7300 | 2.06994 | 6.428 |
| 850 | 21.9262 | 4.05355 | 7.340 | 43.7337 | 2.06978 | 6.422 |
| 900 | 22.6584 | 3.92419 | 8.425 | 43.8088 | 2.06640 | 5.931 |
| 950 | 21.8949 | 4.05927 | 8.057 | 43.7134 | 2.07069 | 6.166 |
| 1000 | 22.3599 | 3.97589 | 9.111 | 43.7345 | 2.06974 | 5.991 |

To complete the crystallographic analysis of M2-48, it is possible to obtain the crystallite size from the available data presented in table 3.

Figure 7:
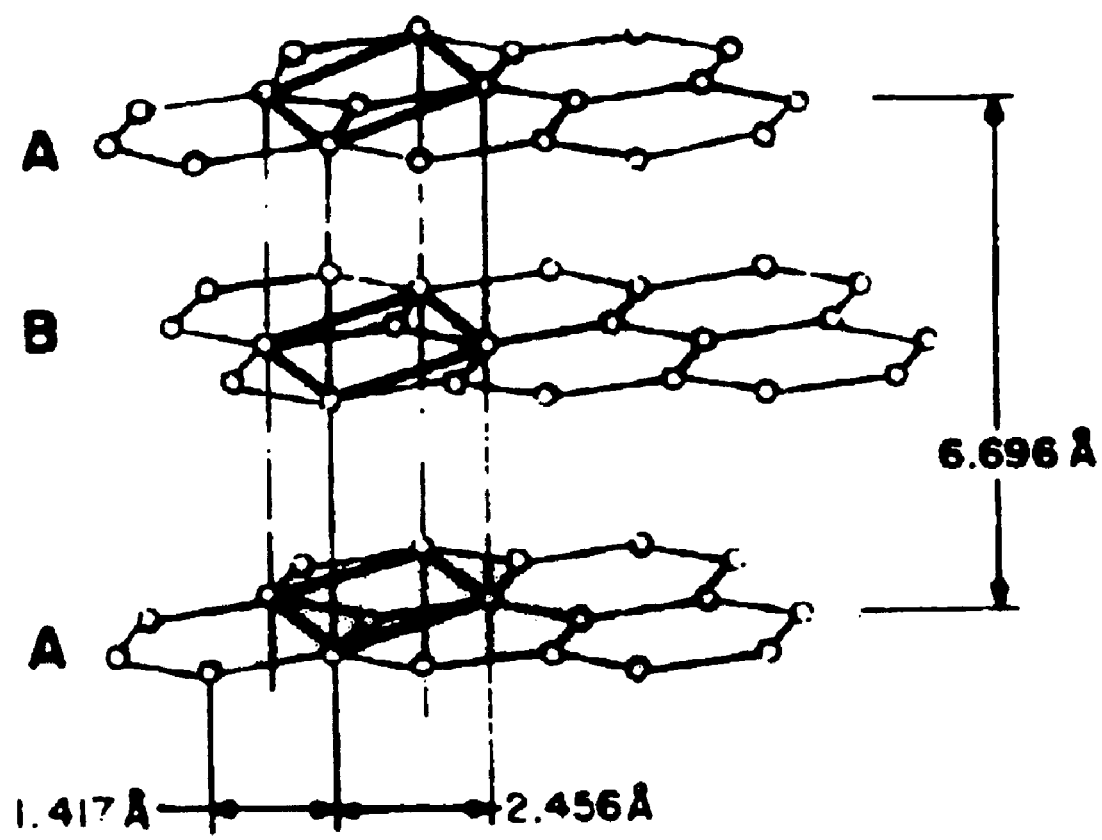
FIG. 7 shows a graphitic structure with the corresponding unit cell.

Generally, when one performs that analysis, three different crystallite parameters (sizes in the literature) are calculated. FIG. 7 (J. B. Donnet, R. C. Bansal, M. J. Wang, "Carbon Black" (Science and Technology) $2^{nd}$ edition, Marcel Dekker, 1993, 91–94) shows a graphitic structure with the corresponding unit cell. There is one crystallite size that represents the height along the 002 planes, which is called Lc (eq.1). There are however two crystallite sizes defined as La one is calculated along the 100 planes and the other one along the 110 planes (eq.2). La can be interpreted as the average diameter of the crystallite.

The crystallite size for M2-48 was calculated using the following formulas [2].

$$Lc = \frac{0.89\,\lambda}{B\cos(\theta)} \quad \text{Eq. 1}$$

$$La = \frac{1.84\,\lambda}{B\cos(\theta)}, \quad \text{Eq. 2}$$

where $\lambda$ is the wavelength of the X-ray beam used (1.54178Å), B is the angular width of the diffraction peak at half maximum (FWHM) in radians and $\theta$ the Bragg angle. The crystallographic sizes calculated for M2-48 pyrolyzed are listed in table 4. In table 5, the crystallographic parameters of M2-48 pyrolyzed at 700° C. are compared to the properties of phenolic resins pyrolyzed at different temperatures as given in Jenkins, G. M. and Kawamura, K., "Polymeric carbons-carbon fibre, glass and char", Cambridge University Press, 1976, 63.

TABLE 4

Crystallographic sizes M2–48 pyrolyzed a different temperatures.

| T (° C.) | Lc (002) (Å) | La (100) (Å) |
|---|---|---|
| 600 | 11.8084 | 10.5955 |
| 650 | 10.4309 | 11.5814 |
| 700 | 11.4522 | 12.6725 |
| 750 | 9.57797 | 12.0653 |
| 800 | 9.00647 | 13.1790 |
| 850 | 10.9103 | 13.1915 |
| 900 | 9.51725 | 14.2873 |
| 950 | 9.9389 | 13.7382 |
| 1000 | 8.7961 | 14.1405 |

TABLE 5

Crystallographic sizes of heat-treated phenolic resin and M2–48 pyrolyzed at 750° C.

| Heat treatment temperature (° C.) | La (100) (Å) | Lc (002) (Å) | d (002) (Å) |
|---|---|---|---|
| 500 | not reported | 12 | 4.80 |
| 700 | not reported | 13 | 4.11 |
| 900 | 27 | 14 | 3.88 |
| 1000 | 29 | 14 | 3.89 |
| M2–48 (Tp = 700° C.) | 11.45 | 12.67 | 4.05 |

The reported values for the crystallographic parameters Lc and d of heat-treated phenolic resin are similar to what was found for pyrolyzed M2-48. La was not reported for phenolic resins heat-treated under 900° C.

Electrochemical Characterisation

Potentiostatic Tests

Figure 8:
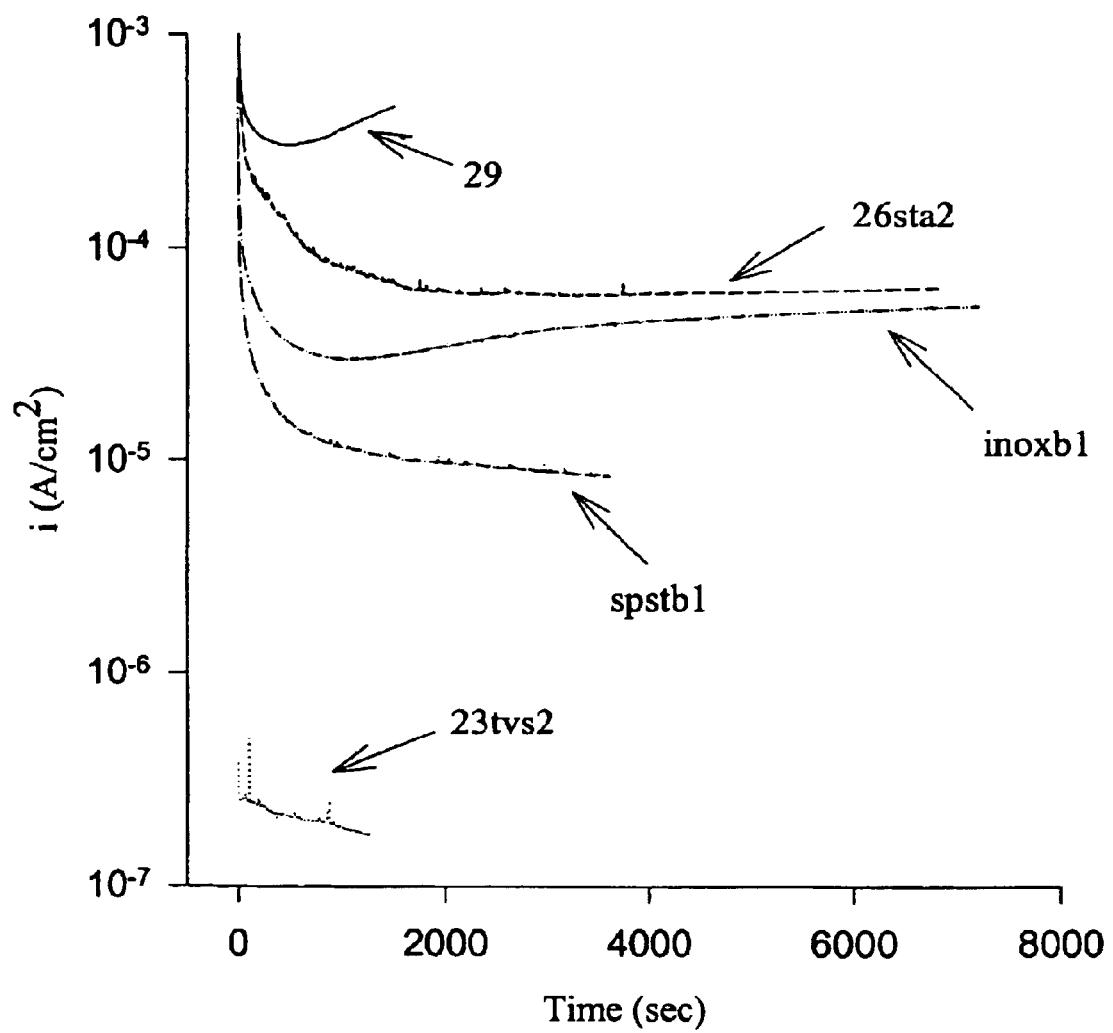
FIG. 8 is a plot showing the results of a potentiostatic test on composites according to the following invention.

One could simulate a PEM fuel cell environment using a number of different parameters. A solution of sulphuric acid (0.5 M) in which hydrogen or air was bubbled to represent respectively the anodic or cathodic environment has been chosen. The normal operating range of potential found in a fuel cell is 0.5 to 1V vs. SHE, and in the following case, the potential was set to 1.23 V vs. SHE. At this potential, stainless steel will be dissolved and any current should be easily observed. Under these harsh conditions, 1.23 V. vs. SHE in a 0.5M sulphuric acid solution, identification of the potentiostatic test failures have been greatly facilitated. FIG. 8 presents the results of the potentiostatic tests performed on several coatings in a 0.5M $H_2SO_4$ solution in which air was bubbled.

The reference point in this comparative study was the unprotected stainless steel 316 L (inoxb1). The curve associated with bare stainless steel 316 L is the curve in the middle of FIG. 8; there are two curves above and below it. For inoxb1, one can easily see that the current first quickly drops to about $3 \times 10^{-5}$ A/cm$^2$, then starts to increase steadily after about 1000 sec. The stainless steel 316 L substrate is effectively dissolved in the electrolyte. A small hole could be seen on the surface of the substrate after completion of the test. The line labelled 29, is a carbon coating that cracked during heat treatment. Severe pitting was observed on the substrate after the test and the current reflects this well, shooting up fast after the beginning of the test. If the test was carried on, the carbon film was ultimately stripped from the substrate.

| Name | Support | Coating |
| --- | --- | --- |
| 29 | SS316L | 29 sprays of M2–48, pyrolyzed |
| 26sta2 | SS316L | 26 sprays of M2–48, pyrolyzed |
| inoxb1 | SS316L | none |
| spstb1 | SS316L | 20 sprays of M2–48, pyrolyzed |
| 236vs2 | SS316L | 23 sprays of M2–48, pyrolyzed + 2 sprays of CCCS, unpyrolyzed |

The preparation of the composite 236vs2 was prepared according to method A and a further film of EMI/RFI Shield was added. The curve labelled 26sta2 is a carbon film that has a very small number of pinholes. There are enough pinholes on the surface to cause localised corrosion. The current is slightly higher than for the unprotected SS 316 L. Since there is localised corrosion, this increase in current is easily explainable as some of the metal is exposed to the solution. The small curve at the bottom of the FIG. 8 is a carbon coating that has been covered with a large amount of unpyrolyzed EMI/RFI Shield. The pyrolyzed M2-48 carbon film is not visible any more if studied under the optical microscope. The current measured for this coating is very small. In fact, the current dropped under 100 nA and the test was stopped because the equipment was not that sensitive. The last curve situated just under the SS 316 L, spstb1, is a good carbon coating without any visible pinholes. No significant difference was observed during the potentiostatic tests when hydrogen replaced air during the experiments.

Figure 9:
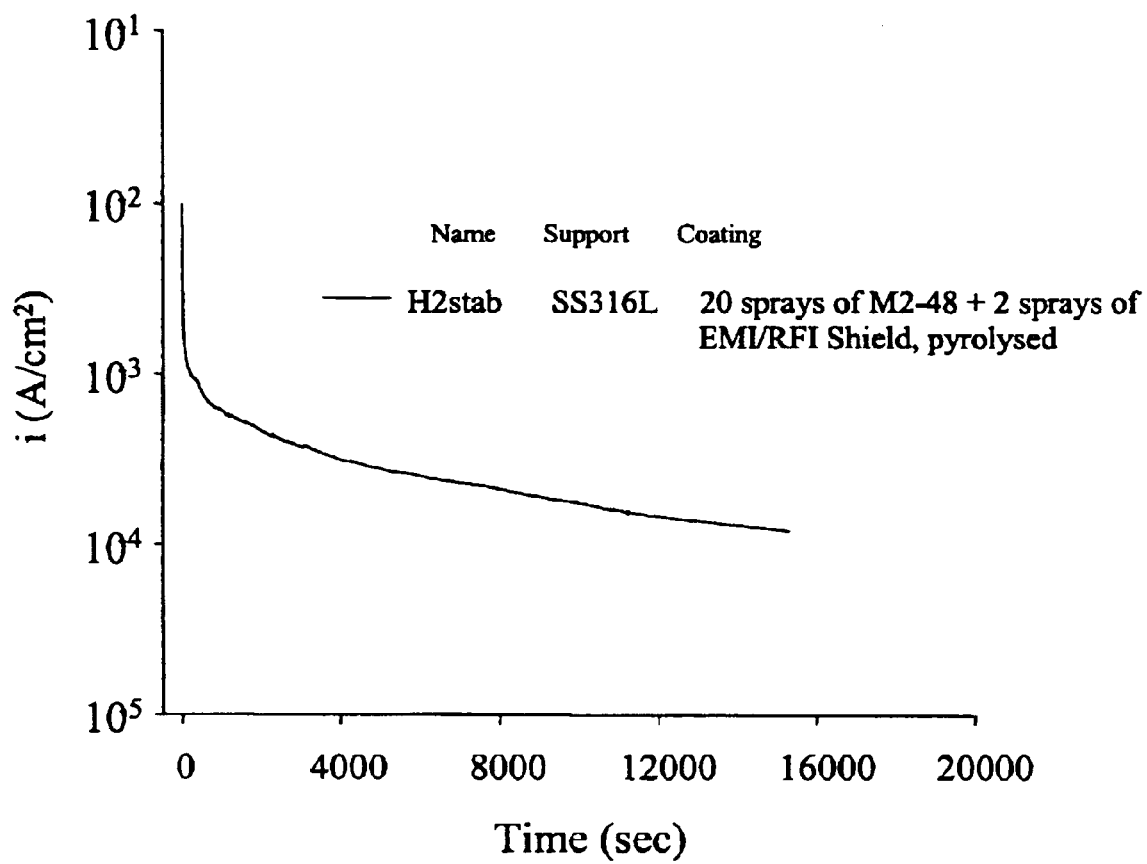
FIG. 9 is a plot showing the result of a potentiostatic test on a composite according to the following invention.

A longer experiment was then performed but this time hydrogen was bubbled in the cell to simulate the anodic environment. This coating was made by pyrolyzing both EMSIRFI Shield (sprayed 2 times) on top of M2-48 (sprayed 20 times) at the same time (see FIG. 2). The results of this test can be seen on FIG. 9.

Ferri-ferro Cyanide System

After having proven that the coating can survive for several hours in a simulated fuel cell environment, it was necessary to be sure that a simple electrochemical reaction can take place on the surface of the new carbon coating. The ferri-ferro cyanide test was therefore performed. The coatings were compared to known materials such as graphite (Poco graphite CZR-1), glassy carbon and a thin film of SnO$_2$ of a known resistivity of (8 Ω-cm). From observations reported in previous studies (A. E. Newkirk, A. S. Hay and R. S. McDonald, *J. Polym. Science Part A*, 2, 1964, 2217) it was first thought that pyrolysis of M2-48 would produce a glassy carbon like material.

Figure 10:
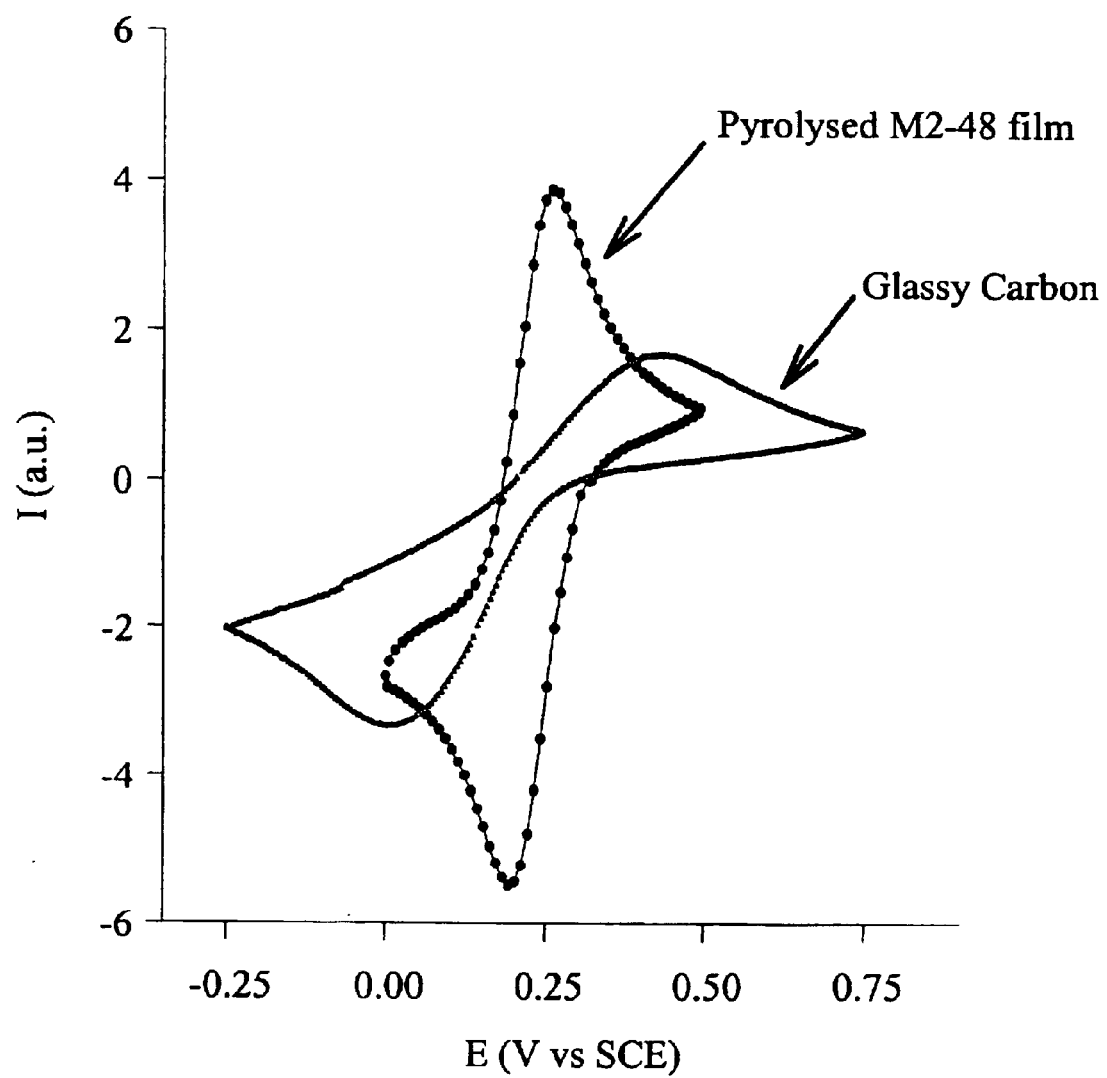
FIG. 10 is a cyclic voltammogram comparing glassy carbon and a composite of the following invention.

FIG. 10 shows a cyclic voltammogram for both glassy carbon and pyrolyzed M2-48 on stainless steel 316 L.

Figure 11:
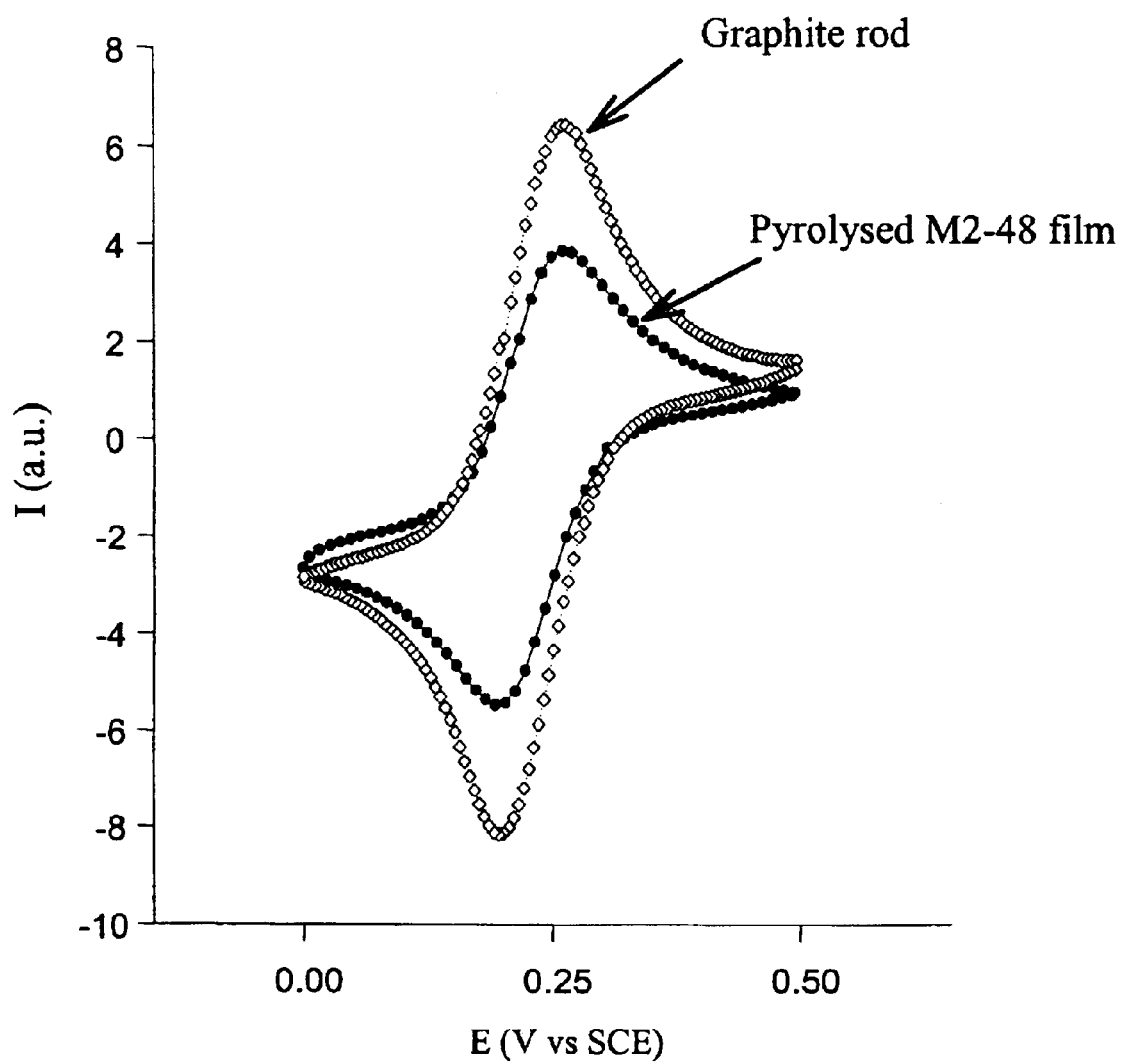
FIG. 11 is a cyclic voltammogram comparing a graphite rod and a composite of the following invention.
Figure 12:
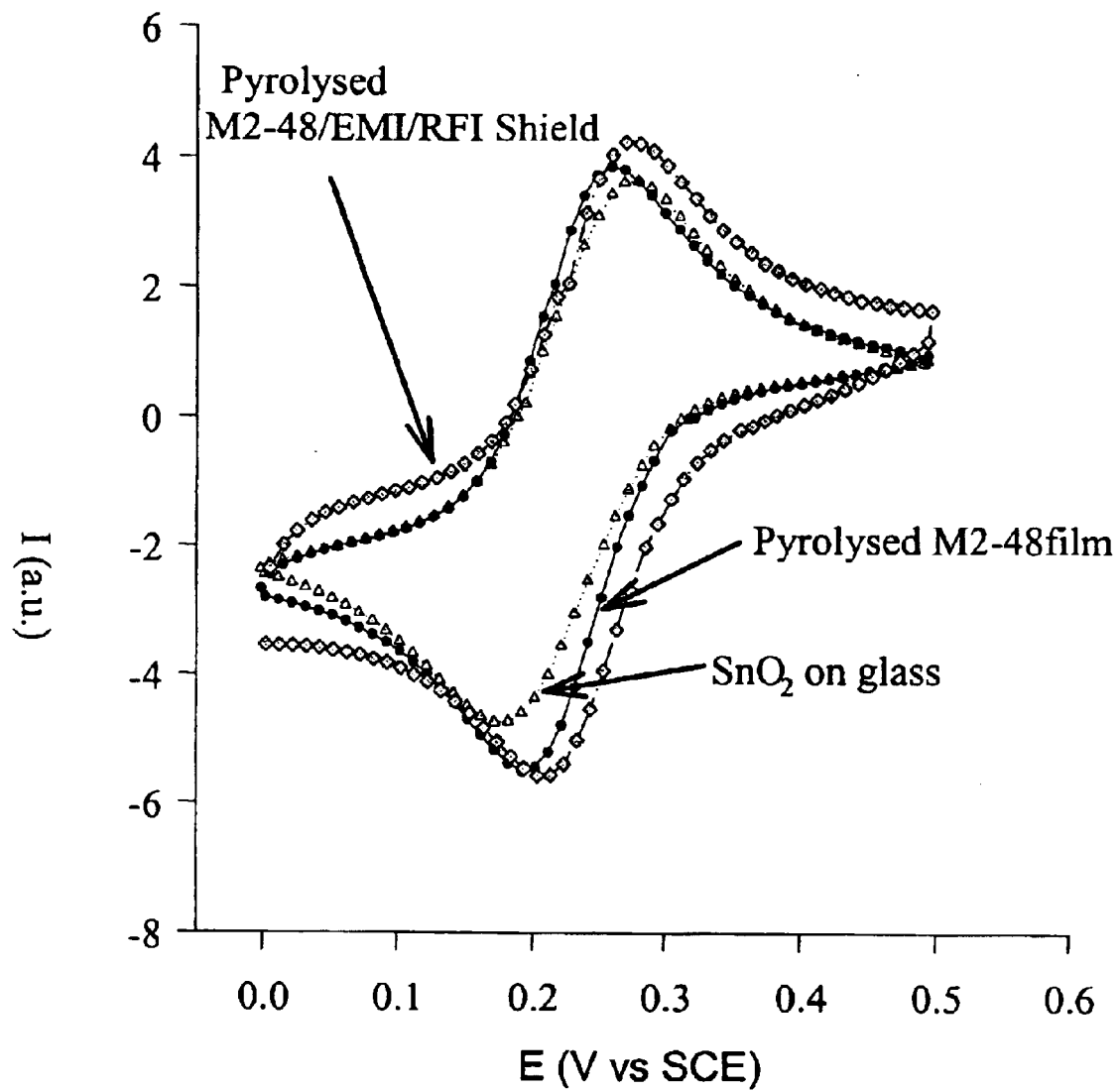
FIG. 12 is a cyclic voltammogram comparing $SnO_2$ and composites of the following invention.

Since the two materials behaviours were obviously different, the pyrolyzed M2-48 was then compared to graphite. FIG. 11 clearly shows the similarity between the behaviour of both materials, using the same parameters. Furthermore, 60 mV normally separate the oxidation and reduction peaks of the reversible ferri-ferro cyanide reaction. In FIG. 12 it is possible to see that a difference of 60 mV exist between the two peaks.

Figure 13:
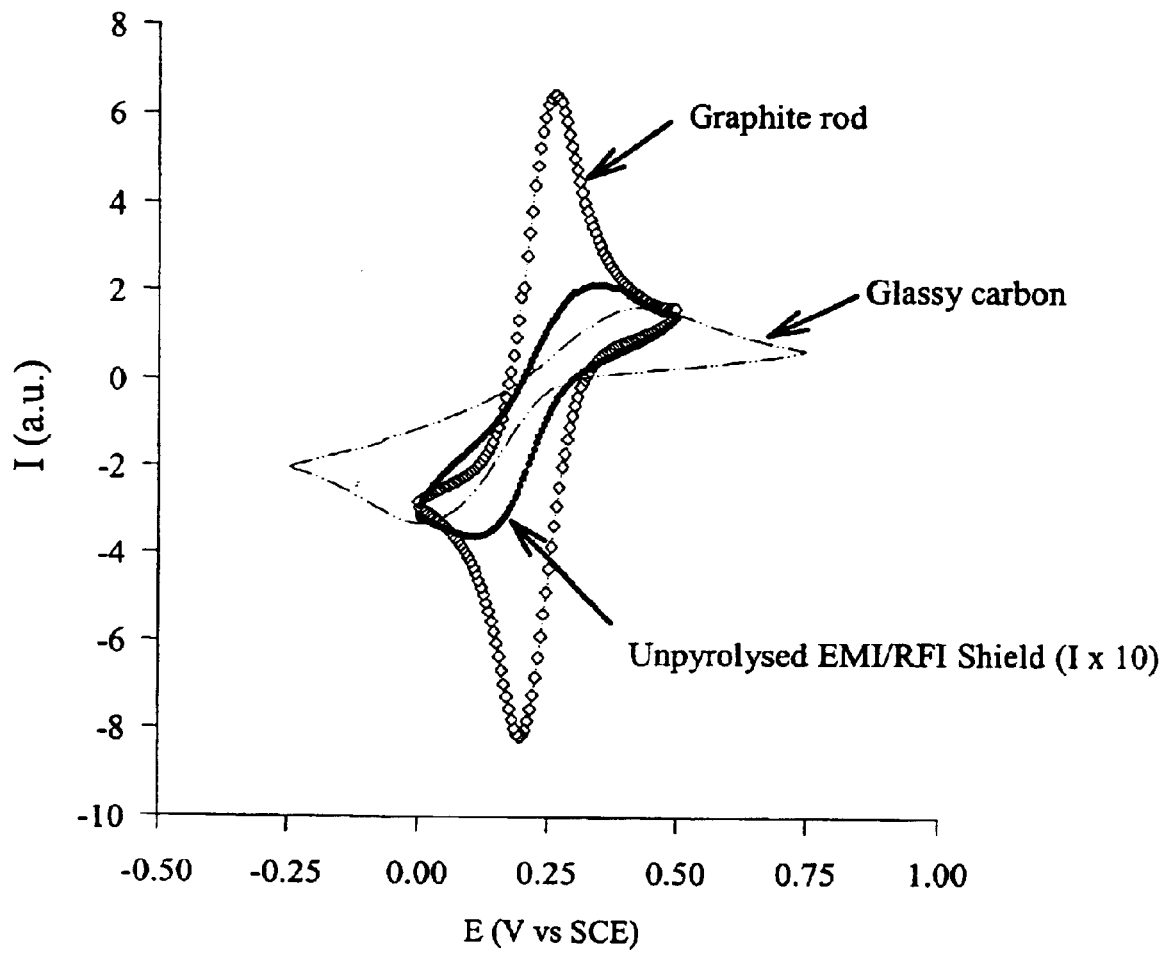
FIG. 13 is a cyclic voltammogram comparing glassy carbon, a graphite rod and a composite of the following invention.

It was now clear that the pyrolyzed M2-48 behaved like graphite and that a reversible reaction could take place on its surface. The product known as EMI/RFI Shield now had to be characterised. On FIG. 8, the line 23tvs2 represents a layer (made of 23 sprays) of M2-48 on which 2 sprays of EMI/RFI Shield were applied. Since the current was suspiciously low, the ferri-ferro cyanide test was performed on the same material. FIG. 13 shows the results of the tests performed on this material.

It is quite clear that the EMI/RFI Shield does not react like graphite or glassy carbon. The current is also very low compared to the other materials and was multiplied by a factor of 10 to be visible on FIG. 13. This is a clear indication that despite its protective effect, EMI/RPI Shield is too resistive and is not suitable for fuel cell application. But nothing prevented pyrolyzing EMI/RFI Shield. Since it contains graphite, a polymer and a solvent, one can assume that only the graphite and polymer fragments would remain after the heat treatment.

EMI/RFI Shield was sprayed on the film made of M2-48 prior to their heat treatment. It was proven that a simple electrochemical reaction could happen quasi reversibly on the surface of the pyrolyzed EMI/RFI Shield since the difference between the oxidation and reduction peaks is 67 mV, which is close to the ideal value of 6 mV. FIG. 12 presents the results of the ferri-ferro cyanide test performed on the pyrolyzed M2-48/EMI/RFI Shield coating. The pyrolyzed M2-48/EMI/RFI Shield coating has a behaviour similar to the one observed for M2-48 alone.

However, it was observed that the new composite coating was rather fragile. Once pyrolyzed, the M2-48/EMI/RFI Shield coating had a powder like appearance. A simple step was added to help stabilising the coating. Three sprays of M2-48 were applied on the film made of EMI/RFI Shield (intermediate film) prior to the pyrolysis (see method B). In fact, the EMI/RFI Shield layer was "sandwiched" between a thick and a thin layer of M2-48. The produced coating was more stable and was used for the in-situ fuel cell tests. The cyclic voltammogram of M2-48/EMI/RFI/M2-48 was similar to that of M2-48 presented in FIGS. 12 and 13.

In-situ Fuel Cell Tests

The final and critical test performed was the in-situ fuel cell test. A 10 cm$^2$ fuel cell was assembled with the protected (A) and unprotected (B) stainless steel plates. The unprotected plates were set into stainless steel 316 L (end plates) and the protected plates into graphite (end plates). Several polarisation curves taken during the duration of the tests are presented in FIG. 14.

Figure 14:
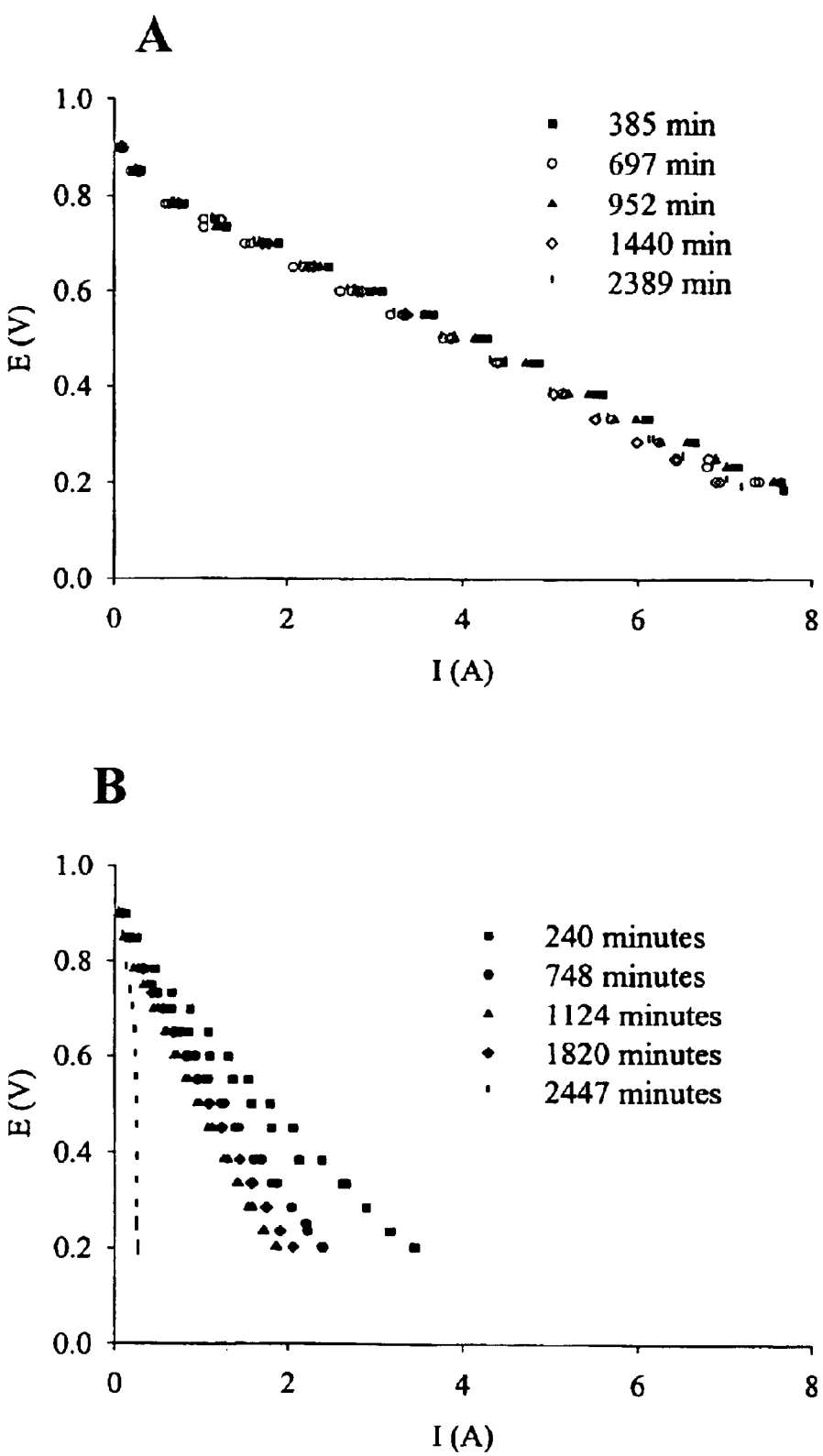
FIG. 14 represents two polarisation curves for a composite of the following invention (A) and for unprotected plates (B), taken during the in-situ fuel cell test.
Figure 15:
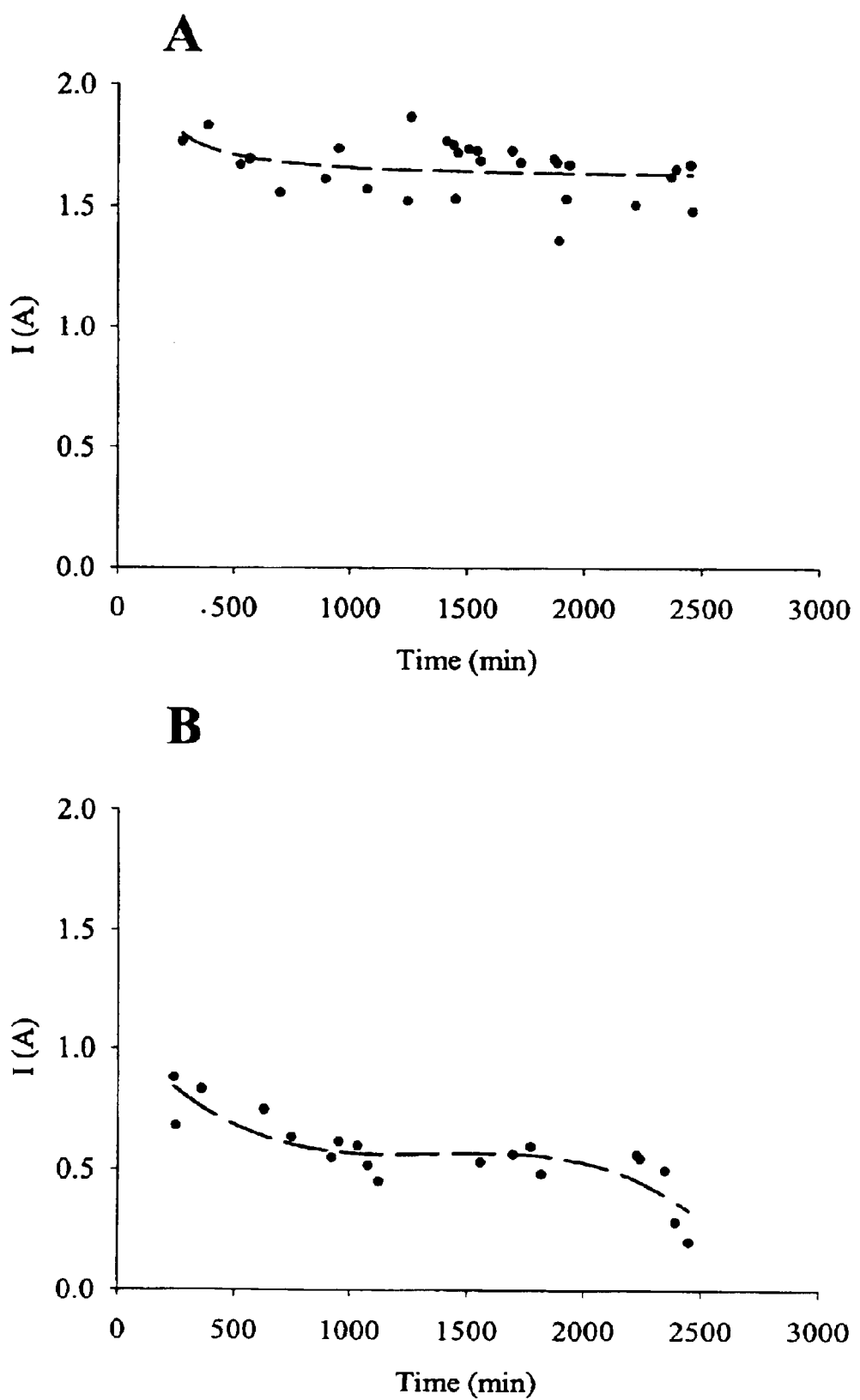
FIG. 15 represents two plots wherein cell current at 0.7 V is expressed as a function of the operating time for a composite of the following invention (A) and for unprotected plates (B)
Figure 16:
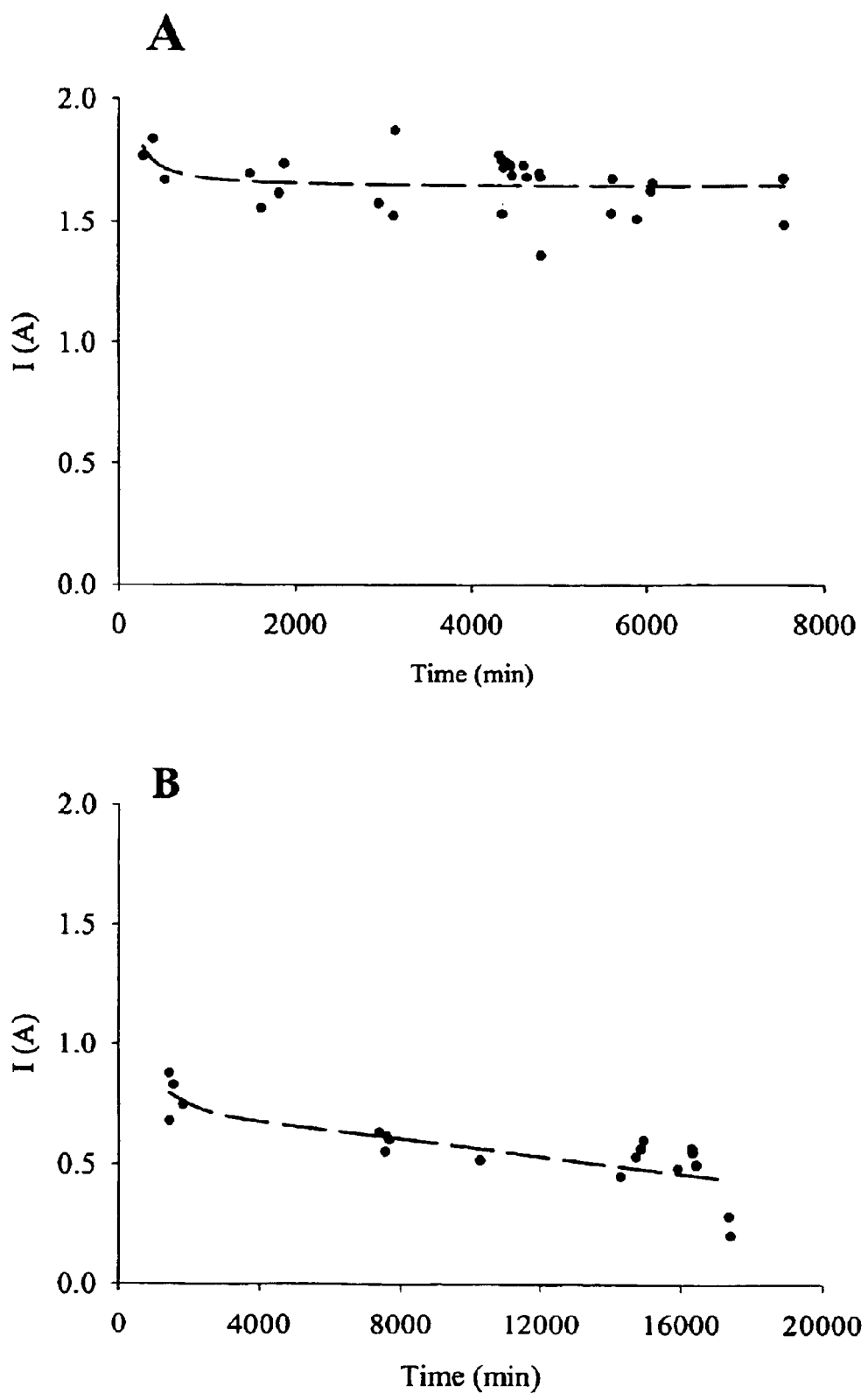
FIG. 16 represents two plots wherein cell current at 0.7 V is expressed as a function of the overall time including the time spent under no load for a composite of the following invention (A) and for unprotected plates (B)

FIG. 14 clearly shows that the loss of performance during the test of 2500 minutes (about 42 h), is almost negligible in the case of the protected plates, but is significant for the unprotected plates. Upon completion of the tests, the cell was disassembled and the plates examined. The unprotected plates showed a change in coloration on about fifty percent of their surface. There was even some localise pitting found on the unprotected plate on the anode side. No changes were observed on the protected plates. To be able to easily assess the loss of performance, FIG. 15 presents the current for protected plates (A) and unprotected plates (B) at 0.7 V for the duration of the test. FIG. 16 presents the same results as FIG. 15 but the time axis also includes the time spent under no load.

It is also possible to assess the degradation of the performances as a function of the time. In the case of the unprotected plates, the effect of the corrosion is clear, but for the protected plate, currents remain stable after a while (about 1000 min). Furthermore at given voltage, 0.7V, the current produced by the cell made with unprotected plates is 0.8 A at the beginning of the test. On the other hand, the current of the cell made with the protected plates is above 1.5 A at the beginning of the test. Since the conditions were kept as close as possible for the two tests, it is safe to assume that the difference between the performances of the cell is directly related to the nature of the surface of the flow fields.

To confirm this suspicion, another set of experiments was conducted. This time the flow channels were protected but the (end plates) were made of stainless steel 316 L (SS 316 L). The performance of this new cell was anticipated to be somewhere in between those previously presented. The next table shows the currents taken at 0.6V (V1) and 0.2V (V2) for the three cells after two hours of operation with the nature of the surfaces in contact inside the cell. Since this portion of the polarization curve is almost linear, the slope was also added in table 6.

TABLE 6

Currents taken after two hours of operation at 0.2 V and 0.6 V.

| End plate material | Flow channels | V1 (V) | I1 (A) | V2 (V) | I2 (A) | Slope (ohm) | Increase (ohm) | # SS316L surface | Increase/ # surface |
|---|---|---|---|---|---|---|---|---|---|
| SS 316L | SS 316L | 0.6 | 1.34 | 0.2 | 3.46 | 0.189 | 0.103 | 6 | 0.017 |
| SS 316L | protected SS 316L | 0.6 | 2.10 | 0.2 | 5.42 | 0.120 | 0.034 | 2 | 0.017 |
| Graphite | protected SS 316L | 0.6 | 3.04 | 0.2 | 7.68 | 0.086 |  | 0 |  |

The results of table 6 show that the maximum current increases when there are less stainless steel surfaces in contact inside the cell. There is however no apparent mathematical relation between the maximum current and the number of stainless steel surfaces. The next step was to calculate the absolute value of the slope |slope| of the relatively linear portion of the polarization curve between 0.2V and 0.6V. This value |slope| is the resistance of the cell. Again, there is no direct relation between the |value| of the slope and the number of steel surfaces. There is however a relation between the increase in the value of the |slope| and the number of stainless steel 316 L surfaces in contact inside the cell (column 8 and 9 in table 6). The last column of table 6 shows that this increase divided by the number of stainless steel surfaces is constant and its value of about 0.017. Therefore, one can affirm that not only the use of stainless steel inside a stack affects the long-term stability of the cell but it does also affect its performances.

Physical Characterisation of SS 316 L Plates Coated with the Carbon Coating.

It was previously proven that coatings made of 2 layers of M2-48 and one layer of a pyrolyzed film of a suspension of carbon particulate (EMI/RFI Shield) can resist to a simulated fuel cell environment. This was also confirmed by the in-situ fuel cell testing. The thickness of the coating and its structure as observed using x-ray diffraction are discussed.

Thickness of the Carbon Coating

The thickness of the carbon coating (three protecting layers) on the stainless steel 316 L substrate (see FIG. 3) was measured using an optical microscope. The underlying layer of pyrolyzed M2-48 (carbon layer) can be clearly identified and is darker than the pyrolyzed EMI/RFI Shield layer (intermediate layer). The pyrolyzed layer of M2-48 on top (outer layer) is difficult to distinguish from the pyrolyzed EMI/RFI Shield layer. The values of thickness for the three layers vary from sample to sample. Generally, the carbon layer is from 10 to 30 μm thick and the intermediate layer is from 50 to 70 μm thick. Furthermore, the carbon coating (three layers) is generally from 70 to 100 μm thick. Since the method for producing the coatings relies heavily on a commercial product, EMI/RFI Shield (and other previously mentioned), it is almost impossible to precisely control the thickness of the intermediate layer as it is possible to do with the thickness of the carbon and the outer layers for instance. This is mainly due to the nozzle on the spray can being much harder to control than the airbrush. This did not appeared to affect the behaviour of the protected plates used during the in-situ fuel cell testing.

XRD Characterisation

XRD was performed on the carbon coated stainless steel 316 L plates for two reasons. First, it is easy to detect a graphitic structure and confirm the observation made using the ferri-ferro cyanide system. Second, when a large quantity of carbides is formed in between the substrate and the coating, they should also be detected.

Figure 17:
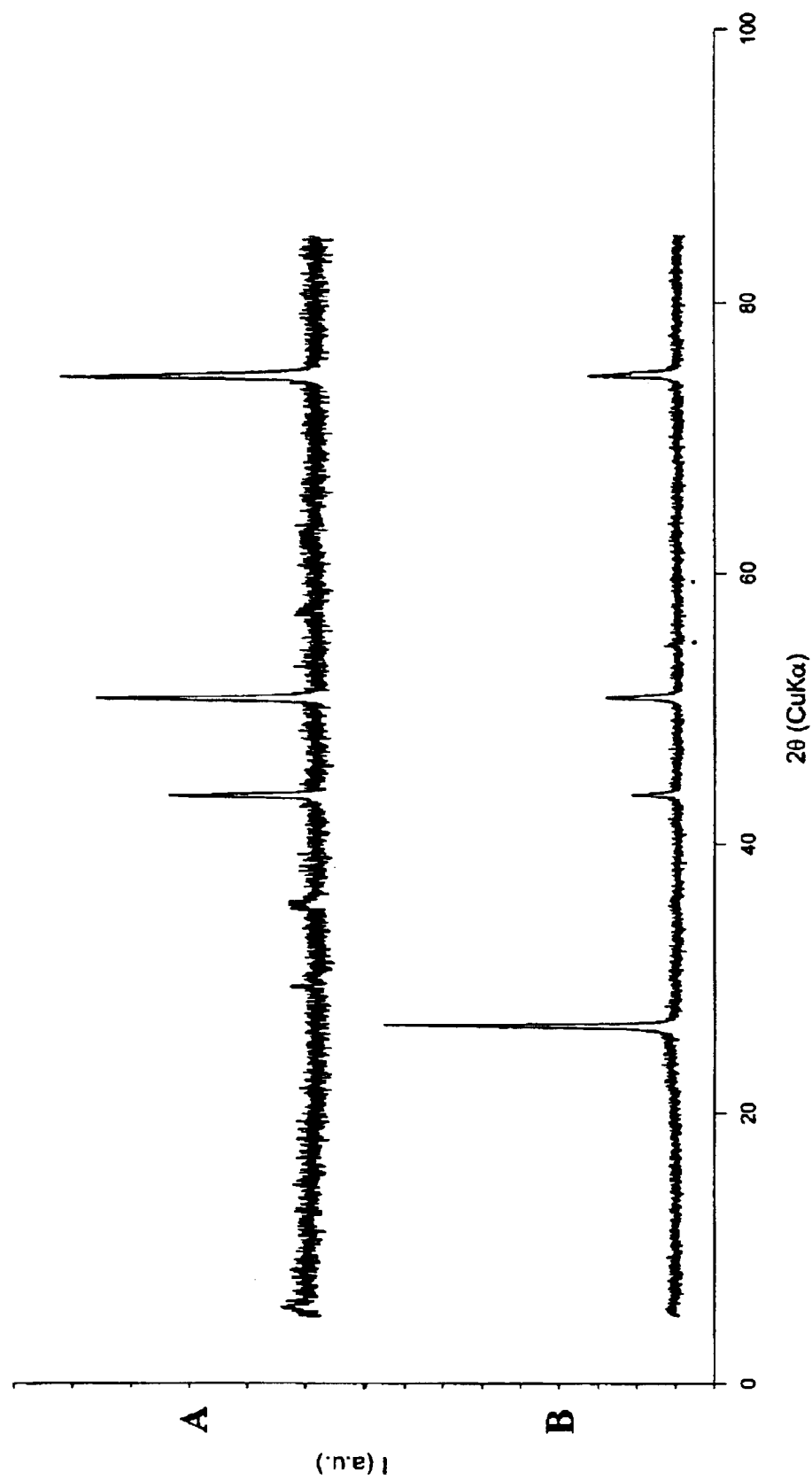
FIG. 17 is a further graph representing X-ray diffraction (XRD) patterns for heat-treated stainless steel 316 L (A) and a composite according to the following invention (B)

FIG. 17 presents the XRD patterns of a stainless steel plate that has gone through the pyrolysis procedure without any coating applied (A) and a carbon covered plate (B). There are two peaks not found on the uncoated stainless steel pattern, a larger one at around 26° and a very small one at around 55°. On the coated steel pattern, the position of the peaks due to the stainless steel 316 L is almost exactly the same as the one found for the uncoated steel. Also, the relative height of the peaks is very close. The results presented in table 7 support this well.

TABLE 7

Results of the XRD analysis on coated and uncoated steel.

|  | Intensity (cps) | Relative intensity (0–1) | relative error Coated vs. Uncoated (%) |
|---|---|---|---|
| Uncoated SS 316L |  |  |  |
| Peak due to SS 316L |  |  |  |
| 43.595° | 869 | 0.6654 | 2.33 |
| 50.765° | 1111 | 0.8507 | 2.22 |
| 74.619° | 1306 | 1.0000 |  |
| Coated plates |  |  |  |
| Peak due to SS 316L |  |  |  |
| 43.600° | 870 | 0.6813 |  |
| 50.765° | 1111 | 0.8700 |  |
| 74.600° | 1277 | 1.000 |  |
| Peak due to carbon coating |  |  |  |
| 26.539° | 3397 | 1.000 |  |
| 54.644° | 505 | 0.1487 |  |

When a large amount of carbide is formed, one would expect the position, the width or the relative intensity of the peaks to change. During the experiment, the change was almost negligible. It seems unlikely that a significant amount of carbides was formed in between the coating and the substrate. A thin layer of carbides would probably not be detected using XRD.

Figure 18:
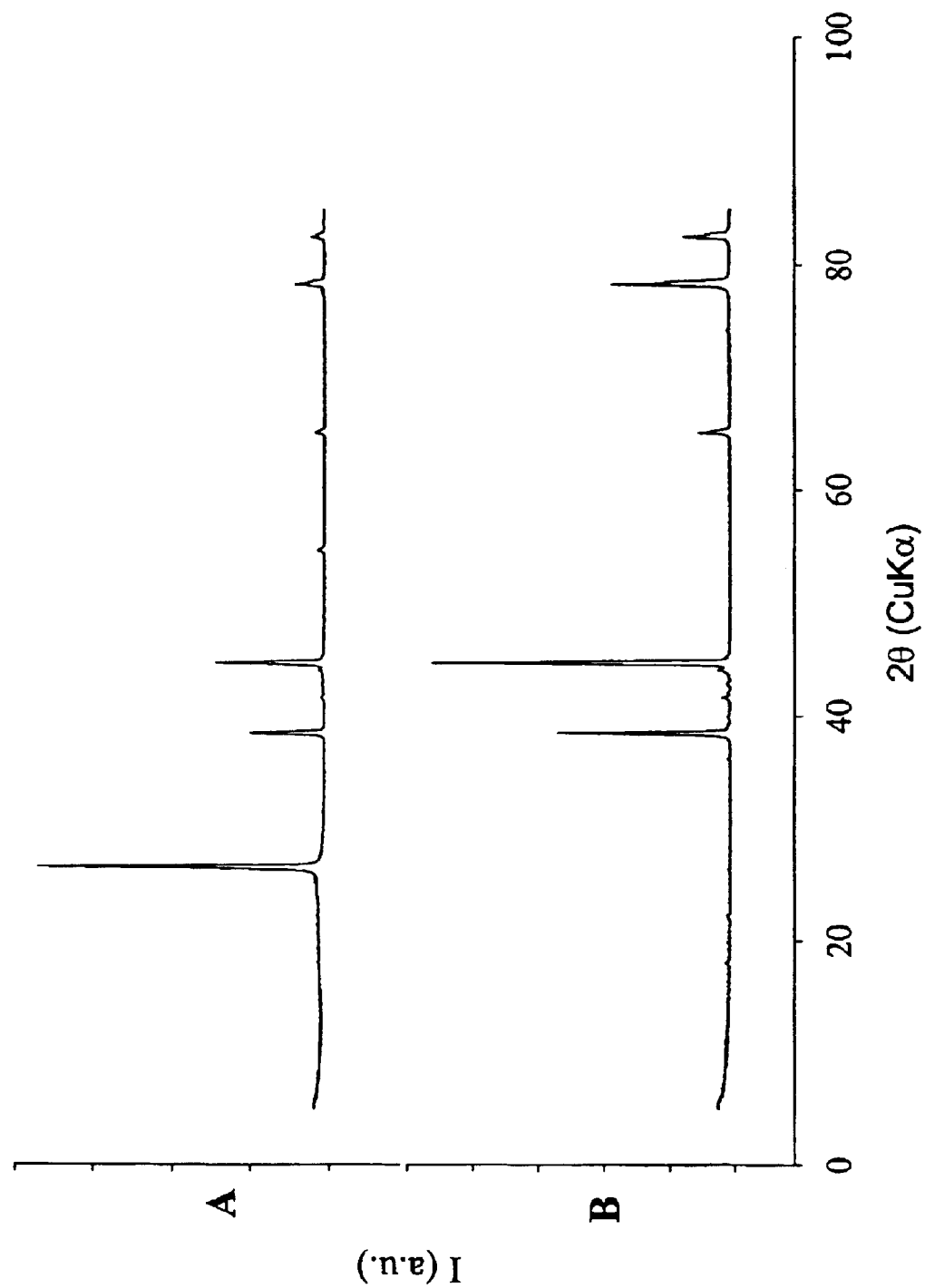
FIG. 18 is a further graph representing X-ray diffraction (XRD) patterns for a composite according to the following invention (A) and aluminium (B).

Peaks due to graphite that were observed on the carbon covered stainless steel 316 L plates. These peaks are not located at the same place, as the one found for pyrolyzed M2-48. This can be due to the fact that a layer of pyrolyzed EMI/RFI Shield of about 100 μm thick was used to produce the coatings observed. Since pyrolyzed EMI/RFI Shield is made of graphite, a polymer and an organic solvent, this is not unpredicted. Therefore, the peak at 26.539° is from the diffraction of the graphite found in CCCS. To prove this assumption, unpyrolyzed pyrolyzed EMI/RFI Shield was sprayed on an aluminium substrate and its XRD pattern measured. We choose to use aluminium because it was readily available and did not produce important peak in the region of interest. FIG. 18 shows the diffraction patterns for aluminium coated with unpyrolyzed pyrolyzed EMI/RFI Shield (A) and aluminium (B). There is a very narrow and high peak at around 25.6° in the pattern of the pyrolyzed EMI/RFI Shield covered aluminium. If more specific regions of this patterns are observed, a small peak at around 55° is also found as well as a broad peak around 22°. This is consistent with the peaks found on the carbon covered stainless steel 316 L pattern of FIG. 17A and that were assigned to the carbon coating. The diffractogram of FIG. 17B is therefore representative of stainless steel 316 L and; the pyrolyzed M2-48 polymer having very little contribution.

Conclusion of the Tests

The chemical stability of the carbon covered BSP surface was, after these tests, assessed and found to be much higher than unprotected stainless steel 316 L. When assembled in a real fuel cell, coated BSP performed well greatly reducing the lost of performance. It was also observed that the maximum current density produced with protected plates was 2 times higher than with unprotected plates.

We claim:

1. A composite comprising a steel substrate having a carbon coating thereon, wherein said carbon coating comprises a carbon layer that has an electrical resistivity below 0.25 Ω-cm and that directly contacts said steel substrate, said carbon layer being derived by pyrolysis of an acetylenic polymer, that is soluble in an organic solvent at a temperature below 110° C. and that has a content of carbon of at least 90 weight %, and being formed on a bare steel surface of said substrate, whereby said carbon coating is protecting said substrate against corrosion and improving long term stability of contact resistivity of the substrate.

2. The composite of claim 1, wherein said steel substrate comprises a steel comprising at least 50 weight % of iron.

3. The composite of claim 2, wherein said steel is selected from the group consisting of 304, 316 and 316L stainless steels.

4. The composite of claim 3, wherein said stainless steel is stainless steel 316L.

5. The composite of claim 1, wherein the acetylenic polymer comprises up to 85 mole % of m-diethynylbenzene.

6. The composite of claim 1, wherein the acetylenic polymer is a copolymer comprising m-diethynylbenzene and a flexibilizing agent effective to enhance solubility of said polymer in said solvent at a temperature below 110° C.

7. The composite of claim 6, wherein the acetylenic polymer comprises from 15 to 30 mole % of the flexibilizing agent.

8. The composite of claim 7, wherein the acetylenic polymer comprises about 20 mole % of the flexibilizing agent.

9. The composite of claim 6, wherein the flexibilizing agent is a monomer of formula:

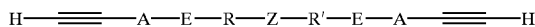

wherein

A is —$(CH_2)_m$— and m has a value of 0, 1 or 2;

Z is O, S,

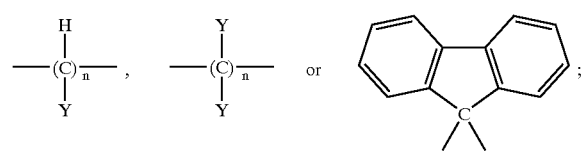

E is O or a single bond;

Y is H, $CH_3$ or $C_6$–$C_{12}$ aryl and n has a value of 0 or 1; and wherein

R and R' are —$(CH_2)_p$— or C6–C12 arylene and p has a value of 0, 1 or 2, and R and R' are the same or different.

10. The composite of claim 9, wherein Z is

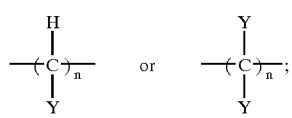

Y is a $C_6$–$C_{12}$ aryl which is

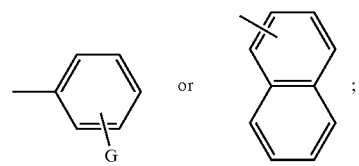

and wherein G is H, $CH_3$, $CH_2$—$CH_3$ or phenyl.

11. The composite of claim 9, wherein R and R' are the same and each represent a $C_6$–$C_{12}$ arylene selected from the group consisting of:

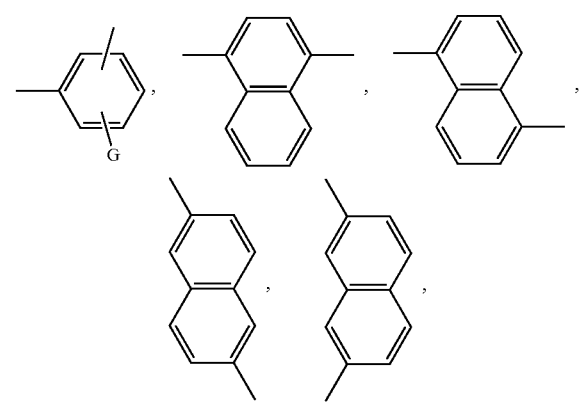

-continued

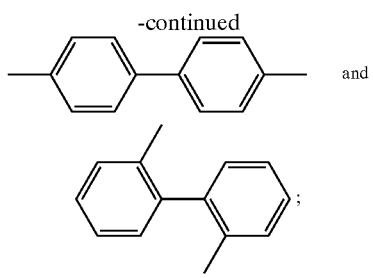

and wherein G is H, CH$_3$, CH$_2$—CH$_3$ or phenyl.

12. The composite of claim 9, wherein the monomer is selected from the group consisting of:

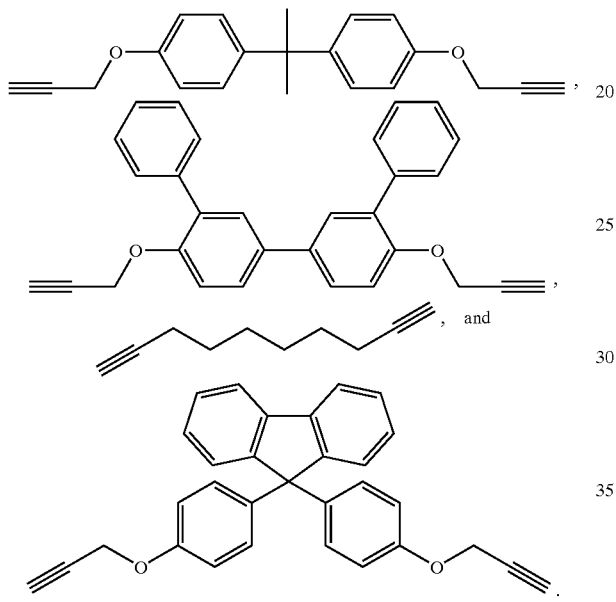

13. The composite of claim 12, wherein said monomer is

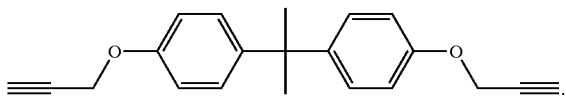

14. The composite of claim 1, wherein the acetylenic polymer comprises up to 85 mole % of a mixture of p-diethynylbenzene and m-diethynylbenzene.

15. The composite of claim 14, wherein said mixture comprises from 0 to 35 mole % of p-diethynylbenzene.

16. The composite of claim 14, wherein said mixture comprises from 5 to 10 mole % of p-diethynylbenzene.

17. The composite of claim 14, wherein the acetylenic polymer is a terpolymer comprising m-diethynylbenzene, p-diethynylbenzene and a flexibilizing agent effective to enhance solubility of said polymer in said solvent at a temperature below 110° C.

18. The composite of claim 17, wherein the acetylenic polymer comprises from 15 to 30 mole % of the flexibilizing agent.

19. The composite of claim 18, wherein the acetylenic polymer comprises about 20 mole % of the flexibilizing agent.

20. The composite of claim 17, wherein the flexibilizing agent is a monomer of formula:

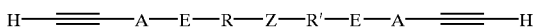

wherein

A is —(CH$_2$)$_m$— and m has a value of 0, 1 or 2;

E is O or a single bond;

Z is O, S,

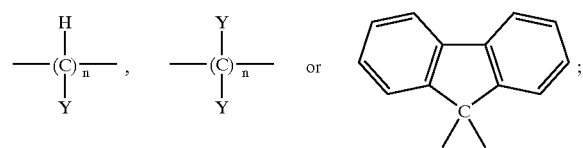

Y is H, CH$_3$ or C$_6$–C$_{12}$ aryl and n has a value of 0 or 1; and wherein

R and R' are —(CH$_2$)$_p$— or C$_6$–C$_{12}$ arylene and p has a value of 0, 1 or 2, and R and R' are the same or different.

21. The composite of claim 20, wherein Z is

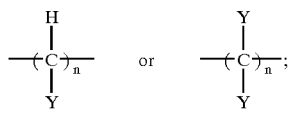

Y is a C$_6$–C$_{12}$ aryl which is

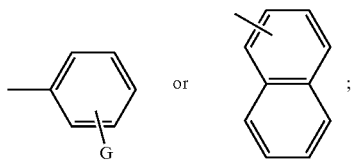

and wherein G is H, CH$_3$, CH$_2$—CH$_3$ or phenyl.

22. The composite of claim 20, wherein R and R' are the same and each represent a C$_6$–C$_{12}$ arylene selected from the group consisting of:

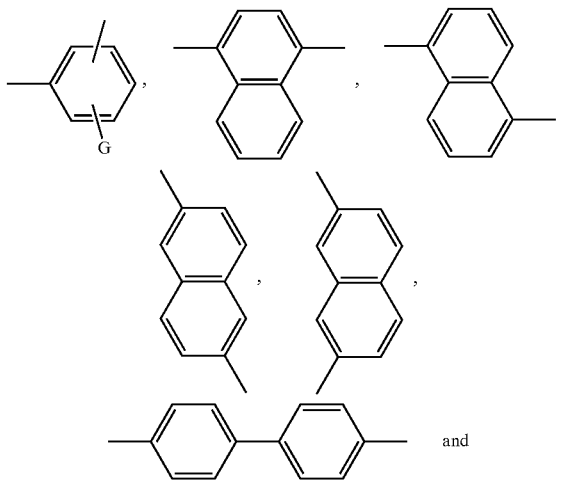

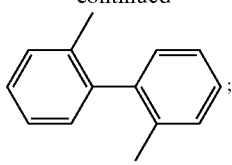

and wherein G is H, CH$_3$, CH$_2$—CH$_3$ or phenyl.

23. The composite of claim 20, wherein the monomer is selected from the group consisting of:

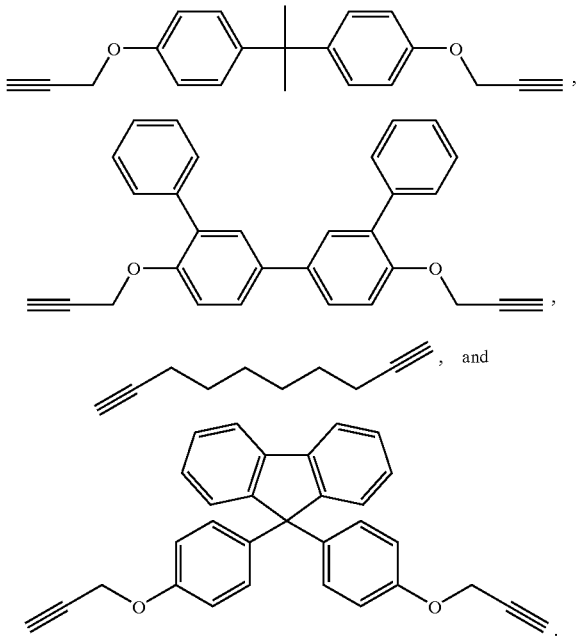

24. The composite of claim 20, wherein said monomer is

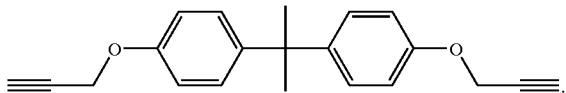

25. The composite of claim 1, wherein said solvent is at least one selected from the group consisting of 1,1,2,2-tetrachloroethane, chlorobenzene, o-dichlorobenzene.

26. The composite of claim 1, wherein said acetylenic polymer is soluble at a temperature below 80° C.

27. The composite of claim 1, wherein said solvent is 1,1,2,2-tetrachloroethane.

28. The composite of claim 1, wherein said acetylenic polymer is soluble at a temperature ranging from 50 to 60° C.

29. The composite of claim 1, wherein the acetylenic polymer has a content of carbon from 92 to 97 weight %.

30. The composite of claim 1, wherein the carbon coating further comprises an intermediate layer on said carbon layer and an outer layer on said intermediate layer.

31. The composite of claim 30, wherein the combination of said carbon layer and said intermediate layer provides a non-porous coating, said outer layer being effective to protect the intermediate layer.

32. The composite of claim 30, wherein the carbon layer and the outer layer are derived by the pyrolysis of the acetylenic polymer.

33. The composite of claim 30, wherein the intermediate layer comprises pyrolyzed carbon derived by contacting a suspension of particulate carbon in an organic solvent or an aqueous media with said carbon layer.

34. The composite of claim 33, wherein said suspension comprises particulate carbon selected from the group consisting of at least one of carbon black, graphite, acetylene black, Ketjen black.

35. The composite of claim 30, wherein the carbon coating, including the carbon layer, the intermediate layer and the outer layer, is from 70 to 100 µm thick.

36. The composite of claim 1, wherein the carbon coating improves the contact resistance between said substrate and a carbon paper.

37. The composite of claim 1, wherein said substrate is in the form of a plate.

38. In a fuel cell having electrodes, membranes and a bipolar separation plate, the improvement comprising the composite of claim 1 included in said bipolar separation plate.

* * * * *